(12) United States Patent
Arisaka et al.

(10) Patent No.: US 9,360,381 B2
(45) Date of Patent: Jun. 7, 2016

(54) SEMICONDUCTOR DEVICE AND DATA GENERATION METHOD

(75) Inventors: Naoya Arisaka, Kanagawa (JP); Takayasu Ito, Kanagawa (JP); Masashi Horiguchi, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 1078 days.

(21) Appl. No.: 13/439,289

(22) Filed: Apr. 4, 2012

(65) Prior Publication Data

US 2012/0265473 A1     Oct. 18, 2012

(30) Foreign Application Priority Data

Apr. 13, 2011 (JP) ................................ 2011-089080

(51) Int. Cl.
| | |
|---|---|
| *G01K 7/01* | (2006.01) |
| *G01K 15/00* | (2006.01) |
| *G05F 3/30* | (2006.01) |

(52) U.S. Cl.
CPC ................ *G01K 15/005* (2013.01); *G01K 7/01* (2013.01); *G05F 3/30* (2013.01)

(58) Field of Classification Search
CPC ............................... G01K 15/005; G01K 7/01
See application file for complete search history.

(56) References Cited

U.S. PATENT DOCUMENTS

| | | | |
|---|---|---|---|
| 4,379,520 A * | 4/1983 | Tomsu ........................ | 236/49.3 |
| 6,890,097 B2 | 5/2005 | Tanaka | |
| 7,674,035 B2 | 3/2010 | Pertijs et al. | |
| 2006/0202821 A1 | 9/2006 | Cohen | |
| 2008/0165823 A1 | 7/2008 | Caliboso | |

FOREIGN PATENT DOCUMENTS

| | | |
|---|---|---|
| CN | 101019010 A | 8/2007 |
| JP | 04-225250 A | 8/1992 |

(Continued)

OTHER PUBLICATIONS

Japanese Office Action received in corresponding Japanese Application No. 2011-089080 dated Oct. 23, 2014.

(Continued)

*Primary Examiner* — Mischita Henson
(74) *Attorney, Agent, or Firm* — Mattingly & Malur, PC

(57) ABSTRACT

A semiconductor device with improved temperature detection accuracy includes a coefficient calculation circuitry which calculates a plurality of N-th order coefficients, where N is an integer equal to or greater than one, of a correction function as an N-th order approximation of a characteristic function which relates temperature data measured by the temperature sensor and the actual temperature. The coefficient calculation circuitry uses N+1 pieces of the temperature data including a theoretical value at absolute zero in the characteristic function and N measured values of the temperature data measured by the temperature sensor unit at N points of temperature. A corrected temperatures are output using the correction function with the calculated coefficients and measured temperature values.

13 Claims, 20 Drawing Sheets

(56) References Cited

FOREIGN PATENT DOCUMENTS

| | | |
|---|---|---|
| JP | 2001-298160 A | 10/2001 |
| JP | 2004-134472 A | 4/2004 |
| JP | 2008-002853 A | 1/2008 |
| JP | 2008-513766 A | 5/2008 |
| JP | 2008-249582 A | 10/2008 |
| WO | 02/27919 A2 | 4/2002 |
| WO | 2007/143191 A2 | 12/2007 |
| WO | 2010/002591 A1 | 1/2010 |

OTHER PUBLICATIONS

Chinese Office Action received in corresponding Chinese Application No. 201210108048.5 dated Oct. 20, 2015.

Extended European Search Report received in corresponding European Application No. 12160958.0 dated Nov. 27, 2015.

* cited by examiner

SEMICONDUCTOR DEVICE AND DATA GENERATION METHOD

CROSS-REFERENCE TO RELATED APPLICATIONS

The disclosure of Japanese Patent Application No. 2011-089080 filed on Apr. 13, 2011 including the specification, drawings and abstract is incorporated herein by reference in its entirety.

BACKGROUND

The present invention relates to a semiconductor device provided with a temperature sensor, and to a data generation method for the semiconductor device, and especially relates to technology which is effective when applied to a semiconductor device requiring a highly accurate detection of temperature.

In recent years, there has been a growing demand for a higher temperature operation of a microcomputer for vehicle engine control. In conjunction with the demand, there is also a high demand of mounting a temperature sensor to the microcomputer. Since the engine of a vehicle operates at an extremely high temperature, the temperature sensor to be mounted needs to perform temperature detection with high accuracy on a high temperature side in particular.

In one of methods of the temperature detection by an on-chip temperature sensor mounted on a microcomputer in the past, for example, a voltage with a positive or negative temperature characteristic and a temperature-independent reference voltage generated by a certain method are employed and compared with each other by an analog or digital method in a temperature sensor, thereby the temperature detection is performed. The voltage with a positive or negative temperature characteristic described above uses the following voltage, for example.

As the voltage with a negative temperature characteristic, that is, the voltage decreases as the temperature increases, one uses a voltage appearing across both ends of a diode when a current is made to flow through the diode, by employing as the diode a parasitic diode, a parasitic bipolar transistor, etc. existing between wells formed over a silicon substrate by the CMOS process. As the voltage with a positive temperature characteristic, that is, the voltage increases proportionally as the temperature increases, one uses a difference voltage which is the difference of voltages appearing across both ends of the diode when the current with different values is made to flow through the diode, as is the case with the above. As another example of the voltage with a positive temperature characteristic, one may use a difference voltage produced by the difference of a base-emitter voltage of two parasitic bipolar transistors having mutually different emitter areas, when a current with the same value is made to flow through each of the two bipolar transistors.

Such voltages have comparatively high linearity to temperature. However, the voltages have nonlinear components of a second or higher order in practice, and this fact is a factor which degrades the accuracy of the temperature detection. It is generally known that devices (such as an MOS transistor, a resistor, a capacitor, a bipolar transistor, a diode) formed over a silicon substrate by the CMOS process exhibit variations in the absolute value and relative value of the element characteristic, due to process variations, power supply voltage fluctuations, and others. This fact is also a factor which degrades the accuracy of the temperature detection. Accordingly, in order to reduce the degradation of the accuracy of the temperature detection due to process variations etc., the technique of trimming for compensating variations for each chip is utilized in many cases. There is also a method of improving the detection accuracy, by performing calculation for compensating temperature with a hardware-based or software-based technique, in the temperature detection. Patent Literature 1 through Patent Literature 3, for example, disclose related methods concerning the calculation for compensating temperature.

A semiconductor device provided with a temperature sensor, disclosed by Patent Literature 1, further comprises an actual temperature measuring circuit. Defining the temperature measured by the actual temperature measuring circuit concerned as a true temperature, the measurement temperature by the temperature sensor is compensated and outputted, based on the correspondence relation of the temperature and the output value of the temperature sensor. A theoretical output value of the temperature sensor at a predetermined temperature is calculated from an ideal formula which indicates the correspondence relation of the output value of the temperature sensor and the temperature, derived by experience in advance, and the difference between the theoretical output value and the actual output value of the temperature sensor at the temperature is calculated. This difference is used as the correction data. Then, when performing the temperature measurement, a value obtained after the correction data is added to or subtracted from the output value of the temperature sensor is outputted as the measured value.

A semiconductor device provided with a temperature sensor, disclosed by Patent Literature 2, compensates the measurement temperature of the temperature sensor, through the use of a correction function which indicates the relation between a temperature and a voltage appearing across both ends of a diode employed as the temperature sensor. The temperature is measured in advance with a temperature measurement device installed separately from the semiconductor device, and the measured temperature is defined as a true temperature. The voltage appearing across both ends of the diode at the time is also measured. The voltage value is measured at two temperature points, and a linear function of the voltage value and the temperature is derived from those measured data, and used as the correction function. When performing temperature measurement, a voltage value of the temperature sensor is converted into a temperature using the correction function, and the temperature is outputted as a measured value.

A semiconductor device provided with a temperature sensor, disclosed by Patent Literature 3, creates correction data corresponding to an output value of the temperature sensor in advance outside the chip. In the actual operation, the semiconductor device outputs the correction data concerned addressed by the output value, as the measurement temperature. That is, a temperature is measured with a temperature measurement device installed separately from the semiconductor device concerned, and is defined as the true temperature. Data of a power supply voltage and an output value of the temperature sensor at that time are also obtained in advance. The correction data is created on the basis of the obtained data. When performing temperature measurement, the correction data addressed by the output value of the temperature sensor is outputted as the measurement temperature. The accuracy of the temperature compensation is decided by the number of acquired data, corresponding to the set number of the temperature and the power supply voltage which are set up in creating the correction data.

(Patent Literature 1) Japanese Patent Laid-open No. 2004-134472

(Patent Literature 2) Japanese Patent Laid-open No. 2001-298160

(Patent Literature 3) Japanese Patent Laid-open No. Hei 4 (1992)-225250

SUMMARY

However, the present inventors consider that there are the following issues in the related methods described above.

In the first place, the method of the temperature compensation disclosed by Patent Literature 1 assumes that the temperature measured by the actual temperature measuring circuit formed over the same silicon substrate as the temperature sensor is the true temperature. However, considering the process variation, etc. of silicon, the measured temperature concerned lacks in the reliability as the true temperature. The addition and subtraction of the correction data to the output value of the temperature sensor is performed as the correcting method of temperature. However, it is difficult to obtain sufficient accuracy in the correction of temperature by the calculation of only addition and subtraction.

In the second place, the method of the temperature compensation disclosed by Patent Literature 2 expresses the relation of the output voltage of the temperature sensor and the temperature in terms of a linear function for the correction. However, as described above, since there are nonlinear components of a second or higher order in practice, it is difficult to obtain sufficient accuracy in the correction of temperature.

In the third place, according to the method of temperature compensation disclosed by Patent Literature 3, in order to improve the accuracy of the correction of temperature, it is necessary to set up, at the time of creating the correction data, plural patterns of the temperature and the power supply voltage using a tester and to obtain data for each LSI individually, without performing function-based calculation. Accordingly, the method is not realistic.

In order to solve these issues, it is conceivable to perform the temperature compensation by calculation in terms of a correction function of the second or higher order. However, in order to derive the correction function, it is necessary to measure the characteristics of a temperature sensor at plural points of test temperature in the test process of mass production, for example. Accordingly, the number of points of the test temperature increases as the correction function becomes of higher order; therefore, the increase of test time and cost in the test process will be brought about.

The present invention has been made in view of the above circumstances and aims at improvement in the temperature detection accuracy of a temperature sensor, suppressing the number of points of the test temperature in a test process.

The above and other purposes and new features will become clear from description of the specification and the accompanying drawings of the present invention.

The following explains briefly an outline of typical inventions to be disclosed by the present application.

That is, the present semiconductor device comprises a coefficient calculation unit and a correction operation unit. The coefficient calculation unit calculates up to the N-th order coefficient (N is an integer equal to or greater than one) of a correction function as an N-th order approximation of a characteristic function indicating correspondence relation of temperature data measured by a temperature sensor unit and temperature, based on N+1 pieces of the temperature data including a theoretical value of the temperature data at a predetermined temperature in the characteristic function and N measured values of the temperature data measured by the temperature sensor unit at N points of temperature. The correction operation unit generates data including information on temperature, by performing calculation with the use of the correction function to which the coefficients calculated are applied, based on temperature data measured by the temperature sensor unit.

The following explains briefly an effect obtained by the typical inventions to be disclosed by the present application.

That is, according to the present semiconductor device, it is possible to attain improvement in the temperature detection accuracy of the temperature sensor, suppressing the number of points of the test temperature in the test process.

DETAILED DESCRIPTION

Figure 1:
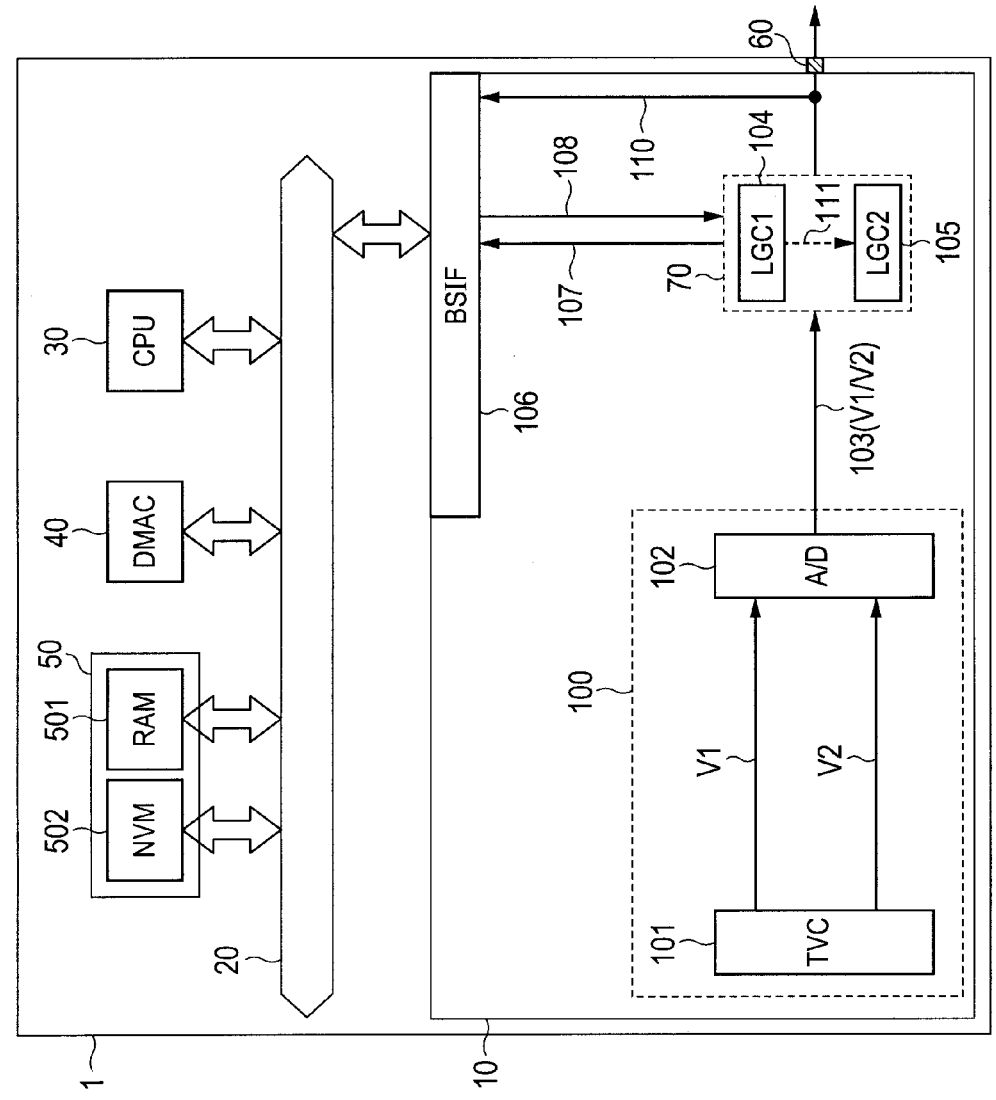
FIG. 1 is a block diagram illustrating an example of a microcomputer with a built-in temperature sensor, for performing data processing, etc. for a vehicle, according to Embodiment 1.

Hereinafter, with reference to the accompanying drawings, the embodiments of the present invention are explained in detail.

1. Outline of Embodiments

First, an outline of typical embodiments of the invention disclosed in the present application is explained. A numerical symbol of the drawing referred to in parentheses in the outline explanation about the typical embodiments only illustrates what is included in the concept of the component to which the numerical symbol is attached.

(1) (A Semiconductor Device Provided with a Circuit which Calculates Coefficients of an N-th Approximate Function from N Measured Values and One Theoretical Value, and a Correction Operation Unit which Performs Calculation Using the Calculated Coefficients.)

A semiconductor device (1, 2, 3) according to a typical embodiment of the present invention comprises a temperature sensor unit (100); and a coefficient calculation unit (104, 204) which calculates up to the N-th order coefficient (N is an integer equal to or greater than one) of a correction function (Equation 11) as an N-th order approximation of a characteristic function (Equation 8) indicating correspondence relation of temperature data (t) measured by the temperature sensor unit and temperature (T, τ), based on N+1 pieces of the temperature data including a theoretical value of the temperature data at a predetermined temperature in the characteristic function and N measured values of the temperature data measured by the temperature sensor unit at N points of temperature. The semiconductor device also comprises a correction operation unit (105, 205,305) which generates data including information on temperature, by performing calculation with the use of the correction function to which, the coefficients calculated are applied, based on temperature data outputted from the temperature sensor unit.

In order to calculate the N-th order coefficient of the correction function, the measured values at N+1 points of the test temperature are necessary. However, the semiconductor device of Paragraph 1 calculates up to the N-th order coefficient of the correction function in terms of N measured values and one theoretical value. According to the present device, it is only necessary to perform the measurement at N points rather than N+1 points of the temperature in the test process, in order to calculate the N-th order coefficient. Therefore, it is possible to attain the accuracy enhancement of the temperature measurement without increasing the number of measurement points.

(2) (A Theoretical Value at the Absolute Zero)

In the semiconductor device according to Paragraph 1, the temperature sensor unit generates the temperature data, on the basis of a first voltage (V1) of which the limiting value at the absolute zero is zero, and a second voltage (V2) of which the limiting value at the absolute zero is given by a constant other than zero. The predetermined temperature is the absolute zero, and the temperature data indicates a value (V1/V2) corresponding to a ratio of the first voltage to the second voltage.

Since the first voltage reduces to "0" (zero) as an extremal value at the absolute zero, the ratio of the first voltage to the second voltage also reduces to "0." That is, since the limiting value of the ratio of the first voltage to the second voltage reduces to zero at the absolute zero, there exists little error difference between the theoretical value and the measured value at the absolute zero; therefore, even if the N-th order coefficient of the correction function is calculated by considering the theoretical value as the measured value, there arises little error difference. Therefore, according to the semiconductor device of Paragraph 2, it becomes possible to perform the temperature measurement with greater accuracy.

(3) (A Specific Example of V1 and V2)

In the semiconductor device according to Paragraph 2, the first voltage corresponds to a difference voltage of a base-emitter voltage of two bipolar transistors having mutually different current densities, and the second voltage corresponds to a forward voltage of a PN junction.

According to the present device, it is possible to generate the first voltage and the second voltage easily.

(4) (A Correction Operation Unit Configured with an Exclusive Logic Circuit)

In the semiconductor device according to one of Paragraph 1 through Paragraph 3, the correction operation unit comprises an exclusive logic circuit.

If the arithmetic function by the correction operation unit is realized by the program execution by a microcomputer, the microcomputer which performs the calculation may fall into a runaway state when the temperature of the semiconductor device becomes high. When the correction operation unit falls in a runaway state, it is likely that the correct operation result may no longer be obtained and the temperature detection accuracy of the temperature sensor may deteriorate. According to the semiconductor device of Paragraph 4, since the correction operation unit is configured with the exclusive logic circuit, it is not likely that the temperature detection accuracy may deteriorate by a thermal runaway; accordingly it is possible to expect the stabilized operation also at high temperature.

(5) (A Coefficient Calculation Unit Configured with an Exclusive Logic Circuit)

In the semiconductor device according to one of Paragraph 1 through Paragraph 4, the coefficient calculation unit comprises an exclusive logic circuit.

According to the present device, as is the case with Paragraph 4, it is not likely that any thermal runaway of the coefficient calculation unit may occur; accordingly, it is possible to expect the stabilized operation also at high temperature.

(6) (A Correction Operation Unit Performing a Correcting Operation by Switching Coefficients Depending on a Temperature Range)

In the semiconductor device (3) according to one of Paragraph 1 through Paragraph 5, the correction operation unit (205) performs the calculation, by switching the information on the coefficients depending on a temperature range.

When one correction function is used in the total range of the measurement temperature demanded, for example, it is likely that the correction accuracy may deteriorate as it departs farther from the N points of the test temperature for calculating the correction function, and that the temperature detection accuracy may deteriorate. According to the semiconductor device of Paragraph 6, since the calculation is performed by switching the correction function depending on a temperature range, it is possible to prevent deterioration of the temperature detection accuracy in the measurement temperature range demanded.

(7) (A Correction Operation Unit Performing a Correcting Operation by Switching an N-th Order Coefficient)

In the semiconductor device according to one of Paragraph 5 and Paragraph 6, the correction operation unit switches the information on an N-th order coefficient among the information on the coefficients.

According to the present device, since not all the coefficients of the correction function are switched but the high order coefficient with the large degree of influence to the temperature detection accuracy is switched, it is not necessary to prepare plural values for all coefficients of the correction function in the test process, and increase in the test process can be suppressed to the minimum; accordingly, it is possible to easily prevent the deterioration of the temperature detection accuracy.

(8) (A Correction Operation Unit Performing a Correcting Operation, by Switching a Coefficient in a High Temperature Side and a Low Temperature Side)

In the semiconductor device according to one of Paragraph 5 through Paragraph 7, the correction operation unit switches the information on the coefficient in a higher temperature range and a lower temperature range with reference to a predetermined temperature in the temperature range of required measurement temperature.

(9) (Configuration of a Temperature Sensor Unit)

In the semiconductor device according to one of Paragraph 1 through Paragraph 8, the temperature sensor unit comprises a temperature-voltage conversion circuit (101) which outputs the first voltage and the second voltage, and an analog-to-digital conversion unit (102) which inputs a voltage corresponding to the first voltage and a voltage corresponding to the second voltage, samples the input voltage via each sampling capacitor, and generates the temperature data.

(10) (The GND Potential of an Input Stage of an A/D Conversion Unit is in Common with the GND Potential of the Sensor Unit.)

In the semiconductor device according to Paragraph 9, one end of the sampling capacitor is set to the same potential as a reference potential (GND_TVC) of the temperature-voltage conversion circuit, and the other end of the sampling capacitor is supplied with the first voltage or the second voltage at the time of sampling and set to the same potential as the reference potential of the temperature-voltage conversion circuit at the time of refreshment of the sampling capacitor.

When a potential difference occurs under the influence of a noise etc. between the reference voltage (for example, the ground voltage) of the temperature-voltage conversion circuit, and the reference voltage (for example, the ground voltage) of the analog-to-digital conversion unit, there is a possible case where the value of the first voltage seen from the reference voltage of the analog-to-digital conversion unit may not become zero at the absolute zero, and this case may cause a measurement error. Therefore, in the semiconductor device according to Paragraph 10, one end of the sampling capacitor is set to the same potential as the reference potential of the temperature-voltage conversion circuit, and the other end of the sampling capacitor is set to the same potential as the reference potential of the temperature-voltage conversion circuit at the time of refreshment of the sampling capacitor. Accordingly, it is possible to suppress the influence of a noise etc. and to prevent the deterioration of the measurement accuracy.

(11) (Shielding by the GND Potential of a Sensor is Provided Around a Wiring of the Output of a Sensor Unit.)

In the semiconductor device according to one of Paragraph 8 and Paragraph 9, the temperature sensor unit further comprises a first shielding wire (1011) for shielding a signal line through which the first voltage is supplied, and a second shielding wire (1012) for shielding a signal line through which the second voltage is supplied. The potential of the first shielding wire and the second shielding wire is set to the reference potential (GND_TVC) of the temperature-voltage conversion circuit.

According to the present device, even if a noise is superimposed on the signal line through which the first voltage is supplied and on the signal line through which the second voltage is supplied, it is possible to reduce the influence of a noise, because the first voltage, the second voltage, and the reference voltage change in phase and with the same amplitude.

(12) (A Selector for Selecting and Outputting a Voltage of a Sensor and an External Voltage)

In the semiconductor device (2, 3) according to one of Paragraph 8 through Paragraph 11, the temperature sensor unit (200, 201) further comprises a first selection unit (112, 113) which switches from the first voltage and the second voltage to respective external input voltages in response to a selection signal, and outputs to the analog-to-digital conversion unit.

According to the present device, it is possible to easily perform operation confirming of the analog-to-digital conversion unit in the test process.

(13) (A Selector for Outputting an A/D Conversion Result Directly)

In the semiconductor device according to one of Paragraph 8 through Paragraph 12, the temperature sensor unit (200, 201) further comprises a second selection unit (114) which switches an output destination of the temperature data generated by the analog-to-digital conversion unit. The second selection unit outputs the temperature data to either of an input signal line or an output signal line of the correction operation unit, in response to the selection signal (12) inputted.

According to the present device, it is possible to output the temperature data without performing the calculation. Accordingly, when the temperature measurement of high accuracy is not requested, for example, the correction operation unit does not perform the calculation, thereby contributing to the low power consumption of the semiconductor device.

(14) (A Coefficient Calculation Method)

A data generation method according to a typical embodiment of the present invention generates, with the use of a program execution device, data $(a_n\text{-}a_0)$ indicating a coefficient of a correction function used by a semiconductor device (1, 2, 3) which uses the correction function as an N-th order approximation (N is an integer equal to or greater than one) of a characteristic function indicating the correspondence relation of temperature data measured by a temperature sensor and temperature, and which generates data including information on temperature from the temperature data measured by the temperature sensor. The processing performed by the program execution device comprises a step of generating data indicating an N-th order coefficient, based on N+1 pieces of the temperature data including a theoretical value of temperature data at a predetermined temperature in the characteristic function and N measured values of temperature data measured by the temperature sensor unit at N points of temperature.

According to the present method, as is the case with Paragraph 1, it is only necessary to perform the measurement at N points rather than N+1 points of the temperature in the test process, in order to calculate the N-th order coefficient. Therefore, it is possible to attain the accuracy enhancement of the temperature measurement without increasing the number of measurement points.

(15) (A Theoretical Value at the Absolute Zero)

In the data generation method according to Paragraph 14, the temperature data indicates a value corresponding to a ratio of a second voltage (V1) of which the limiting value at the absolute zero is zero to a first voltage (V2) of which the limiting value at the absolute zero is given by a constant other than zero, and the predetermined temperature is the absolute zero.

According to the present method, as is the case with Paragraph 2, when the N-th order coefficient of the correction function is calculated considering the theoretical value as the measured value at the absolute zero, there arises little error difference. Therefore, it is possible to determine the correction function with greater accuracy.

(16) (A Specific Example of V1 and V2)

In the data generation method according to Paragraph 15, the first voltage corresponds to a forward voltage of a PN junction, and the second voltage corresponds to a difference voltage of a base-emitter voltage of two bipolar transistors having mutually different current densities.

According to the present method, it is possible to generate the first voltage and the second voltage easily.

2. Details of Embodiments

The embodiments are explained further in full detail.

Embodiment 1

FIG. 1 is a block diagram illustrating an example of a microcomputer with a built-in temperature sensor, for performing data processing, etc. for a vehicle, as one embodiment of a semiconductor device according to the present invention. Although not limited in particular, the microcomputer 1 illustrated in FIG. 1 is formed over a semiconductor substrate like single crystal silicon, by the well-known CMOS integrated circuit manufacturing technology.

The microcomputer 1 comprises a central processing unit (CPU) 30, a temperature sensor 10, a transfer controlling unit (DMAC (Direct Memory Access Controller)) 40, a memory unit 50, a bus 20, and other peripheral circuits (not shown). The CPU 30 performs engine control, etc. of a vehicle and processing of data utilized for the control concerned, etc. The CPU 30 makes the temperature sensor 10 perform temperature measurement by supplying instructions of temperature detection via the bus 20.

The memory unit 50 comprises a nonvolatile memory (NVM) 502 and a volatile memory (RAM: Random Access Memory) 501. The NVM 502 is a flash memory etc., for example, and stores a program etc. for instructing the CPU 30 to perform data processing etc. The NVM 502 also stores an output (V1/V2) of an A/D conversion unit 102 measured at a test temperature in a test process before product shipment, correction operation coefficients as a parameter required for correcting operation in the temperature detection to be described later, and others. The RAM 501 is an SDRAM etc., for example, and is utilized for the temporary storage of data in the data processing, etc. of the CPU 30. The CPU 30 sets up a transfer condition etc. and the transfer controlling unit 40 performs data transfer to the memory unit 50 according to the transfer request from the CPU 30, the temperature sensor 10, or other peripheral circuits (not shown).

The temperature sensor 10 comprises a sensor unit 100, a logical unit 70 (a coefficient calculation unit 104 and a correction operation unit 105), and a bus interface unit 106. The temperature sensor 10 performs temperature measurement in response to a request for temperature detection from the CPU 30 and others, and outputs the measurement result via the bus interface unit 106 or an output terminal 60.

Figure 2:
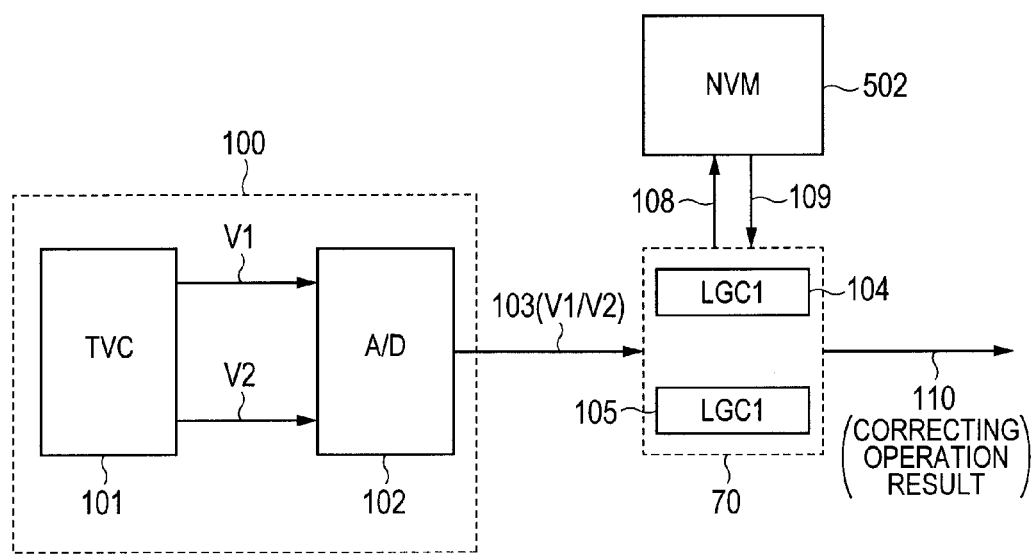
FIG. 2 is an explanatory diagram illustrating an outline of operation of a temperature sensor 10.

FIG. 2 is an explanatory diagram illustrating an outline of operation of the temperature sensor 10.

As illustrated in FIG. 2, a temperature-voltage conversion circuit (TVC) 101 detects a chip temperature Tj, and generates two kinds of analog voltages (a reference voltage V1 and a reference voltage V2) corresponding to the chip temperature Tj. The reference voltages V1 and V2 are inputted into an A/D conversion unit (A/D) 102 in the following stage. The A/D conversion unit 102 converts the ratio (V1/V2) of the reference voltages V1 and V2 into a digital value, and outputs an A/D conversion result 103. The correction operation unit 105 performs correcting operation based on the A/D conversion result 103, and outputs an operation result 110. The correcting operation is performed using an approximate function of a characteristic function expressing the correspondence relation of the A/D conversion result 103 and temperature (the approximate function is also hereinafter called a "correction operation function"). The value of the coefficient of the correction operation function is calculated by the coefficient calculation unit 104. For example, in the test process at the time of the mass production before shipment, the coefficient calculation unit 104 calculates a coefficient based on the A/D conversion result 103 measured at a test temperature, and stores the calculated coefficient in the nonvolatile memory 502. At the time of the actual use after shipment, the information on the coefficient is transferred to the correction operation unit 105 from the nonvolatile memory 502. The correction operation unit 105 performs the correcting operation using the correction operation function to which the transferred coefficient is applied, and outputs an operation result 110 as a temperature sensor detecting temperature.

The following explains each functional block of the temperature sensor 10 in detail.

The sensor unit 100 comprises the temperature-voltage conversion circuit (TVC) 101 and the A/D conversion unit (A/D) 102.

The temperature-voltage conversion circuit 101 outputs two reference voltages V1 and V2, which exhibit temperature dependence.

Figure 3:
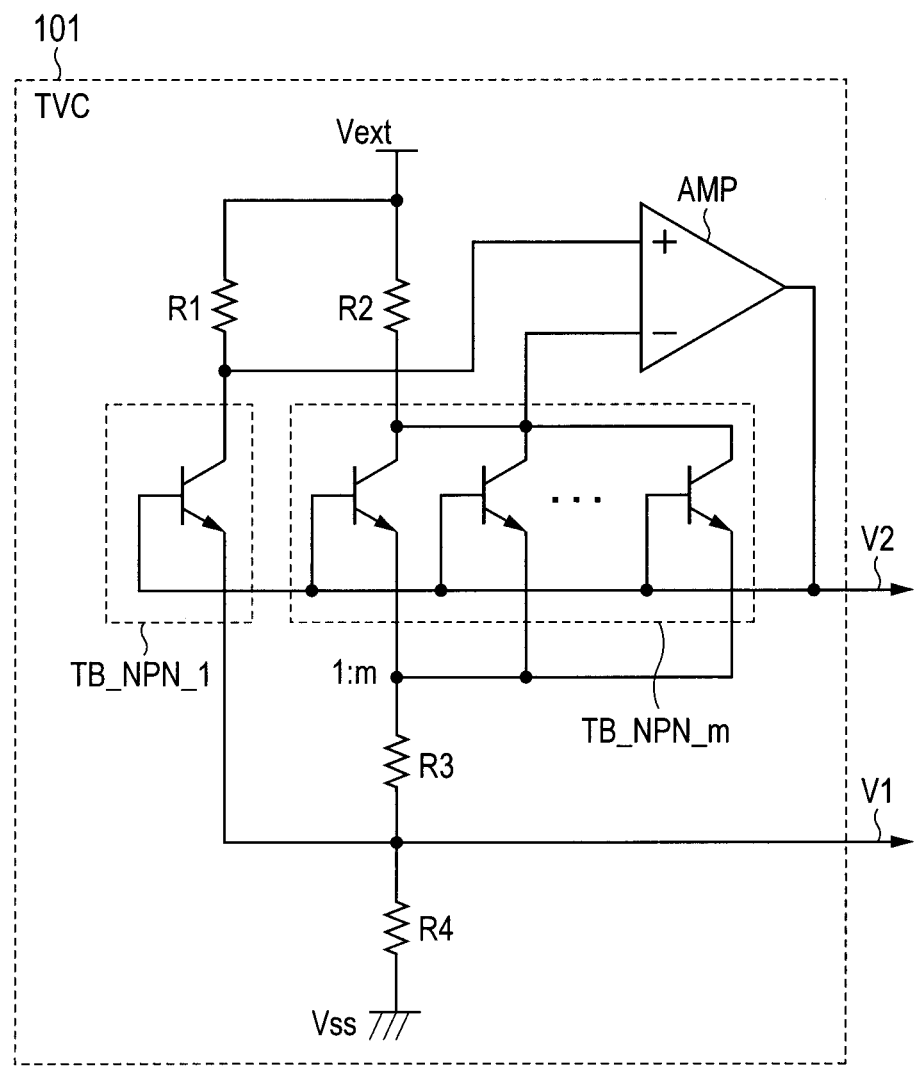
FIG. 3 is a circuit diagram illustrating an example of a temperature-voltage conversion circuit 101.

FIG. 3 is a circuit diagram illustrating an example of the temperature-voltage conversion circuit 101. The temperature-voltage conversion circuit 101 illustrated in FIG. 3 is configured with two bipolar transistors of which the emitter areas are different. The temperature-voltage conversion circuit 101 outputs the reference voltage V1 with positive temperature dependence to temperature, and the reference voltage V2 with low temperature dependence. A parasitic bipolar transistor in the CMOS process is mainly utilized for the bipolar transistor. FIG. 3 illustrates, as an example, the case where a parasitic bipolar transistor of a vertical NPN type is used. As one means for changing the emitter area, plural bipolar transistors of the same kind may be coupled in parallel.

The principle of operation of the temperature-voltage conversion circuit 101 is explained. In FIG. 3, when the output voltage V2 of an operational amplifier is applied to a base (B1) of a parasitic bipolar transistor TB_NPN_1, and to bases of m parasitic bipolar transistors TB_NPN_m (m is an integer equal to or greater than one), a difference occurs in the current density of current which flows through an emitter of the parasitic bipolar transistor TB_NPN_1, and emitters of the parasitic bipolar transistors TB_NPN_m. Depending on the difference of the current density, a difference voltage ΔVBE between the base-emitter voltage of the parasitic bipolar transistor TB_NPN_1 and the base-emitter voltage of the parasitic bipolar transistor TB_NPN_m appears across both ends of a resistor R3. The difference voltage ΔVBE exhibits a positive temperature characteristic. The reference voltage V2 and the reference voltage V1 with a positive temperature characteristic are generated using the present difference voltage ΔVBE. The reference voltages V1 and V2 are expressed by Equation (1) and Equation (2) as follows. In the equations, k is the Boltzmann's constant, q is the charge of an electron, and T is temperature. The value of the reference voltage V2 expressed by Equation 2 is about 1.2v at a normal temperature.

$$V1 = \frac{2kT}{q}\frac{R4}{R3}\ln m \qquad \text{[Equation 1]}$$

$$V2 = VBE + \frac{2kT}{q}\frac{R4}{R3}\ln m \qquad \text{[Equation 2]}$$

When the reference voltages V1 and V2 are expressed as a function of temperature T, Equation 3 and Equation 4 are obtained as follows. Here, A, C, D, and E are constants.

$$V1 = AT \qquad \text{[Equation 3]}$$

$$V2 \cong C + DT + ET^2 \qquad \text{[Equation 4]}$$

The A/D conversion unit 102 inputs the reference voltages V1 and V2 outputted by the temperature-voltage conversion circuit 101 in an analog signal form, converts the ratio of the reference voltages V1 and V2 at a predetermined temperature into a digital signal of j bits (j is an integer equal to or greater than one), and outputs the A/D conversion result 103. The details of the A/D conversion unit 102 will be described later.

The correction operation unit 105 performs correcting operation based on the A/D conversion result 103, and outputs the operation result 110. As described above, the correcting operation is performed using a correction operation function, and the value of the coefficients of the correction operation function is calculated by the coefficient calculation unit 104.

The correcting operation is explained in detail.

Figure 4:
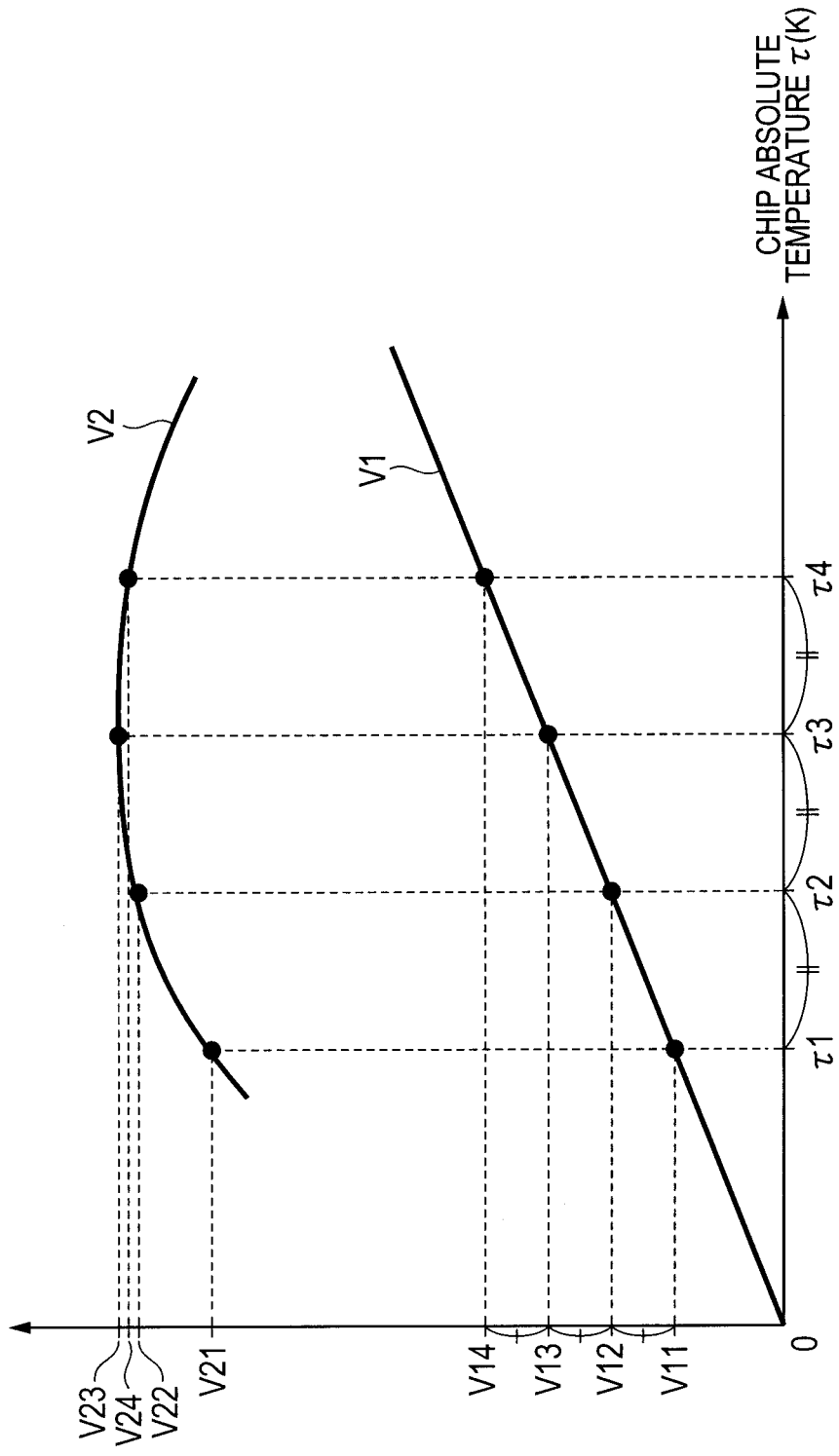
FIG. 4 is an explanatory diagram illustrating temperature characteristics of reference voltages V1 and V2.

FIG. 4 is an explanatory diagram illustrating temperature characteristics of the reference voltages V1 and V2. As illustrated in FIG. 4, taking temperatures τ1, τ2, τ3, and τ4 at an equal interval, the values of the reference voltages V1 and V2 at each temperature are assumed to be V11-V14 and V21-V24. The A/D conversion unit 102 converts a voltage ratio V11/V21 at temperature τ1, for example, into a digital value and outputs it as the A/D conversion result 103, and converts a voltage ratio V12/V22 at temperature τ2, for example, into a digital value, and outputs it as the A/D conversion result 103. Here, since the reference voltage V1 is a linearly increasing voltage in proportion to the temperature, a voltage difference between adjacent two of the four voltages V11, V12, V13, and V14 becomes equal. As compared with this, since the reference voltage V2 is a voltage which has nonlinear dependence on the temperature, a voltage difference between adjacent two of four voltages V12, V22, V23, and V24 is not equal.

Figure 5:
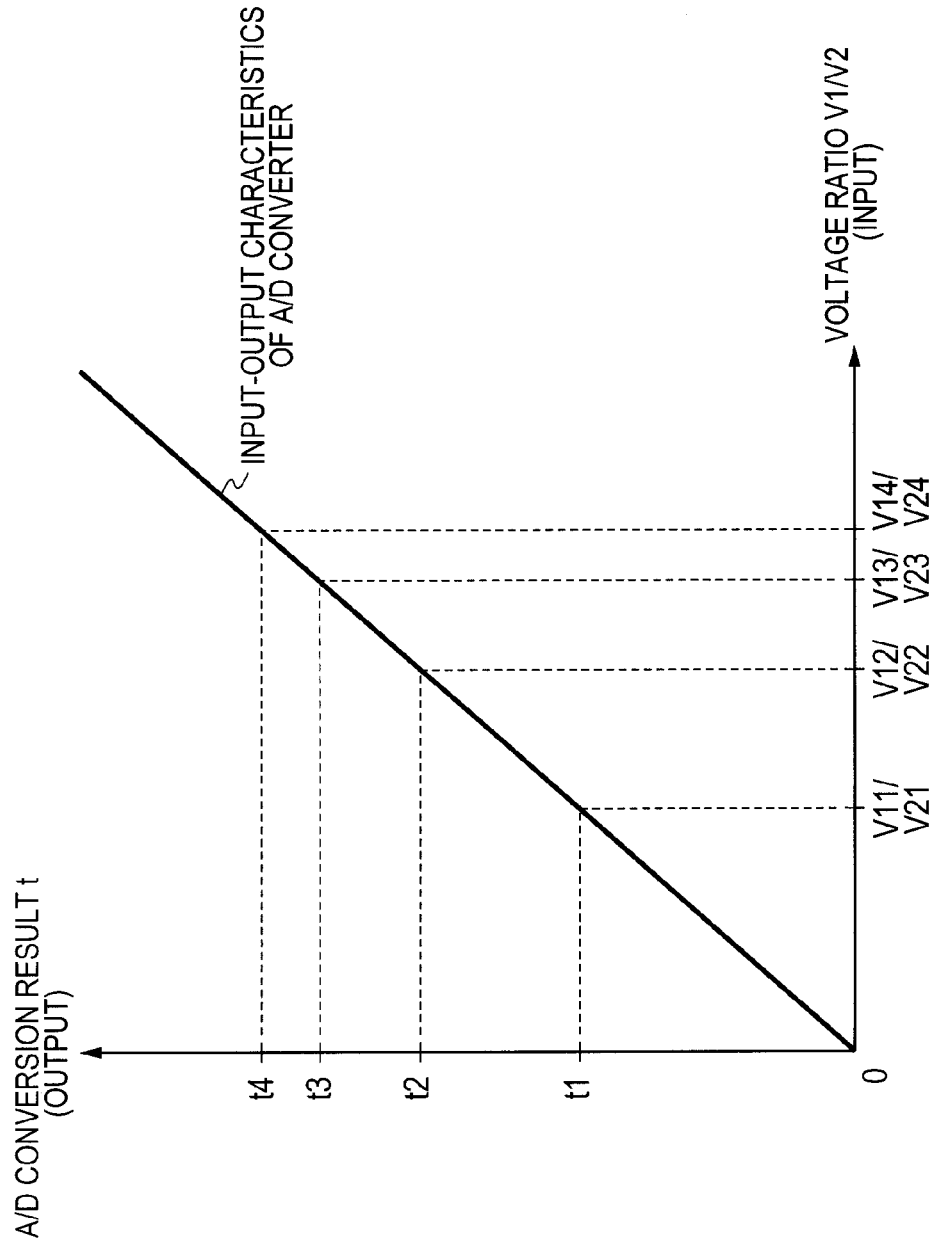
FIG. 5 is an explanatory diagram illustrating a relation between a voltage ratio V1/V2 as an input of an A/D conversion unit 102, and an A/D conversion result t as an output.

FIG. 5 is an explanatory diagram illustrating a relation between the voltage ratio V1/V2 as the input of the A/D conversion unit 102, and the A/D conversion result t as the output. Since the voltage difference between adjacent two of four voltages V21, V22, V23, and V24 of the reference voltage V2 at respective temperatures has nonlinear dependence on the temperature τ, as explained with reference to FIG. 4, even if the temperature difference between adjacent two of the chip temperatures τ1, τ2, τ3, and τ4 is equal, the difference between adjacent two of the voltage ratios (V11/V21), (V12/V22), (V13/V23), and (V14/V24) is not equal. Therefore, even if the linearity of the A/D conversion unit is ideal as shown in FIG. 5, the A/D conversion results t1, t2, t3, and t4 have nonlinear dependence on the temperature τ. The INL (integral nonlinearity) of the A/D conversion unit itself becomes also a factor which induces the nonlinear temperature dependence of the A/D conversion result.

Here, a consideration is given on what kind of value the input V1/V2 of the A/D conversion unit 102 will converge at the absolute zero (T→0). Since the reference voltage V1 is proportional to temperature as expressed by Equation 1 and Equation 3, the reference voltage V1 converges to "0" (zero) at the absolute zero as expressed by Equation 5 in the following. As expressed in Equation 2, the reference voltage V2 is a sum of a base-emitter voltage VBE (the first term) and a voltage proportional to temperature (the second term). Accordingly, at the absolute zero (T→0), the first term of the reference voltage V2 converges to a band gap voltage and the second term converges to "0", and hence the reference voltage V2 converges to the band gap voltage (a constant C) at the absolute zero (T→0), as expressed by Equation 6 in the following. Therefore, the voltage ratio V1/V2 converges to "0" at the absolute zero, as expressed by Equation 7 in the following. Finally, the above consideration results in a conclusion that the graph of the input-output characteristics of the AD conversion circuit passes the origin (0, 0), as illustrated in FIG. 5. However, the temperature-voltage conversion circuit 101 and the A/D conversion unit 102 do not need to operate at the absolute zero, and any test at the absolute zero does not need to be performed in the test process before shipment. The fact that the graph passes theoretically the origin (0, 0) has been well derived from the physical characteristic of the reference voltage V1.

$$\lim_{T \to 0} V1 = 0 \qquad \text{[Equation 5]}$$

$$\lim_{T \to 0} V2 = C \qquad \text{[Equation 6]}$$

$$\lim_{T \to 0} \frac{V1}{V2} = 0 \qquad \text{[Equation 7]}$$

Figure 6:
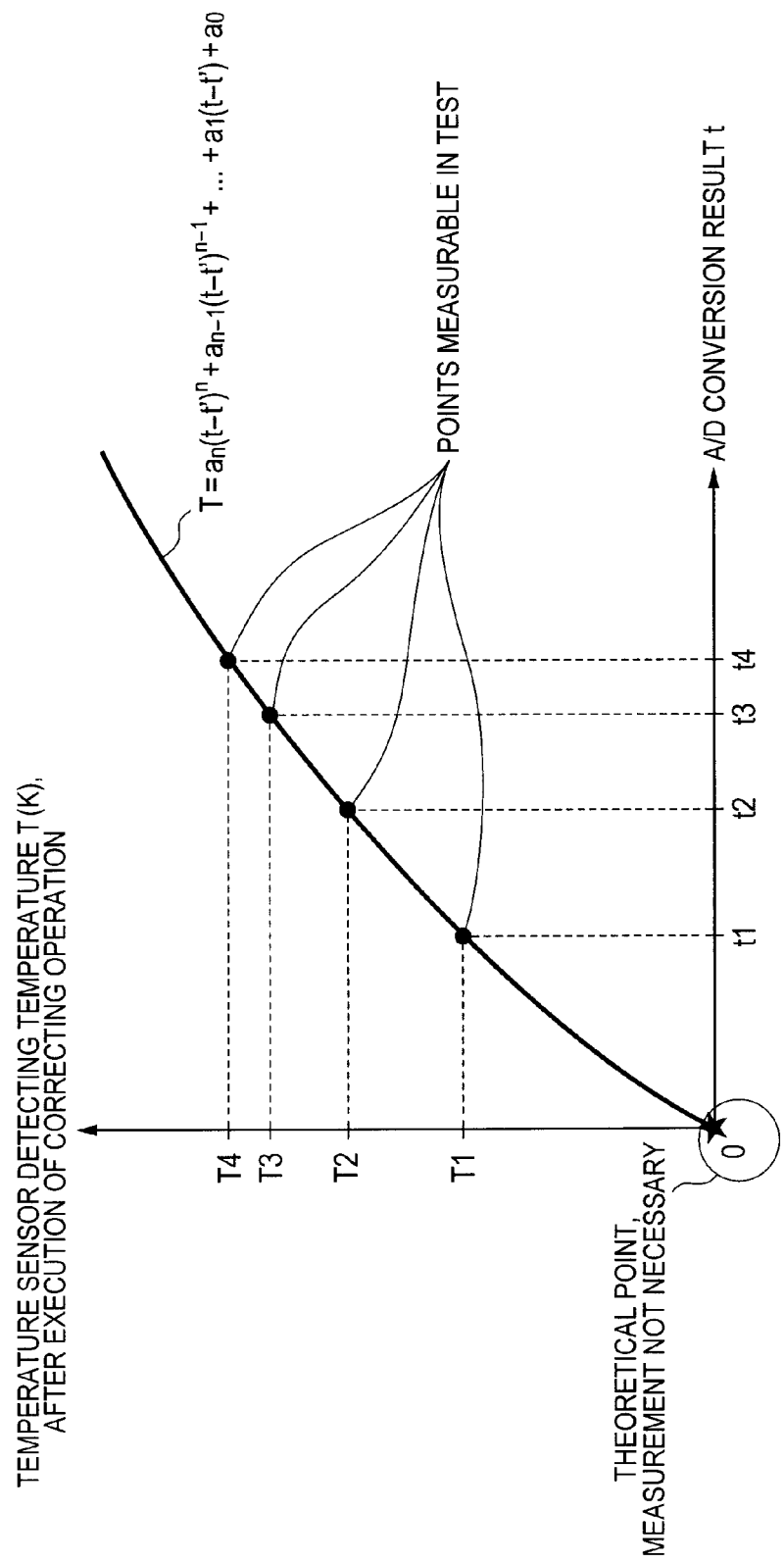
FIG. 6 is an explanatory diagram illustrating a characteristic function which expresses a correspondence relation of temperature T and the A/D conversion result t.

FIG. 6 is an explanatory diagram illustrating a characteristic function which expresses a correspondence relation of temperature T(τ) and the A/D conversion result t. As illustrated in FIG. 6, the horizontal axis is the A/D conversion result t and the vertical axis is temperature T (K). In the figure, it is assumed that the temperatures T1, T2, T3, and T4 correspond to the A/D conversion results t1, t2, t3, and t4, respectively. The temperatures T1, T2, T3, and T4 correspond to temperatures τ1, τ2, τ3, and τ4 of FIG. 4, respectively.

The characteristic function illustrated in FIG. 6 is expressed by Equation 8.

$$T = a_n(t-t')^n + a_{n-1}(t-t')^{n-1} + \ldots + a_1(t-t') + a_0 \quad \text{[Equation 8]}$$

In the equation, $a_n$-$a_0$ are correction operation coefficients and t' is the A/D conversion result at a test temperature. As described above, since the limiting value of the A/D conversion result t converges to "0" at the absolute zero (T→0), the characteristic function expressing the relation between the A/D conversion result t and the temperature sensor detecting temperature T after the correcting operation certainly passes the origin (0, 0).

The characteristic function can also be expressed in terms of a fractional function (Equation 9) or an exponential function (Equation 10), for example. However, the present embodiment is explained by expressing the characteristic function in terms of Equation 8 as an example.

$$T = \frac{a(t-t')}{b_{n-2}(t-t')^n + b_{n-3}(t-t')^{n-1} + \ldots + b_1(t-t') + b_0} + c \quad \text{[Equation 9]}$$

$$T = \frac{e^{af(t-t')} - e^{bf(t-t')}}{2} + c \quad \text{[Equation 10]}$$

As illustrated in FIG. 6, when using the characteristic function expressed by Equation 8, it is possible to compute the value of temperature T from the A/D conversion result t. Accordingly, in the microcomputer 1, the correction operation unit 105 calculates the value of temperature T from the A/D conversion result t, using a correction operation function which approximates the characteristic function of a high order. The subsequent explanation is made on the assumption that the correction operation function is a second-order approximation function of the characteristic function. However, it is not restricted to the case, but when the temperature detection is performed with a greater accuracy, the characteristic function may be approximated with a function of a higher order than the second order (for example, a cubic function).

Figure 7:
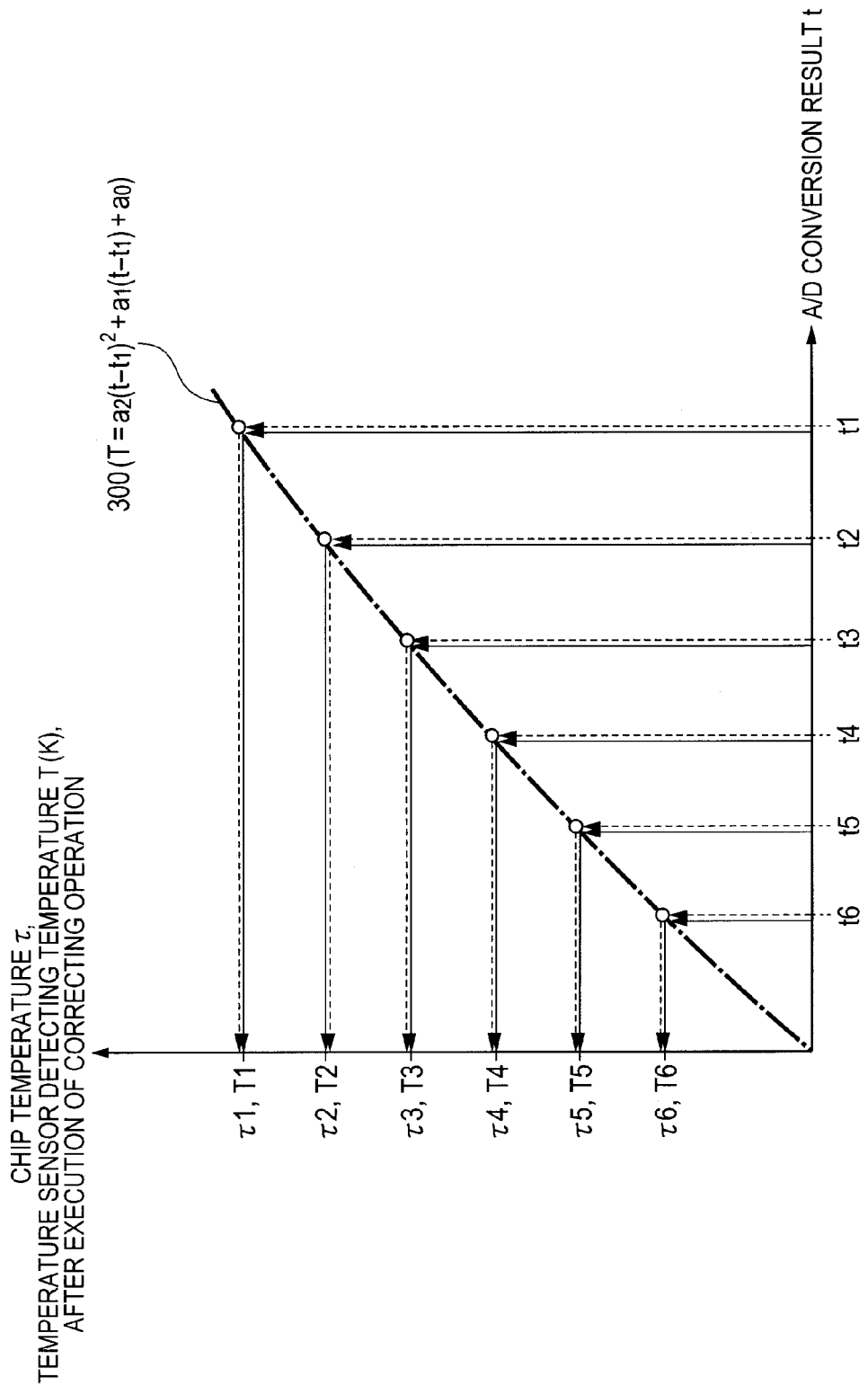
FIG. 7 is an explanatory diagram illustrating a correction operation function when there are no variations in a process ideally.

FIG. 7 is an explanatory diagram illustrating a correction operation function when there are ideally no variations in a process. In FIG. 7, a point marked by a circle is a corresponding point of the A/D conversion result t in the ideal state with no variations in the process and the chip temperature τ, and a curve 300 drawn by a dashed-dotted line is the correction operation function. The correction operation function 300 is a second-order approximation of the characteristic function, and is expressed by Equation 11.

$$T = a_2(t-t_1)^2 + a_1(t-t_1) + a_0 \quad \text{[Equation 11]}$$

In the equation, $a_2$ is a second-order correction operation coefficient, $a_1$ is a first-order correction operation coefficient, and $a_0$ is a zero-order correction operation coefficient. It is also assumed that the A/D conversion result t' at the test temperature is the A/D conversion result t1 at the test temperature τ1 as an example.

When there is no process variation, the temperature sensor detecting temperature T and the actual temperature τ of a chip is substantially equal to a value which can be predicted by circuit simulation or the like; accordingly, the error of the chip temperature τ and the correcting operation result T is small. However, since an element characteristic exhibits variations by a process variation etc. as described above, the characteristic of the temperature sensor 10 exhibits variations among chips; accordingly, it is likely that the characteristic function may differ for each chip. That is, it is likely that the correction operation coefficients $a_n$-$a_0$ may differ for each chip. Accordingly, in the microcomputer 1, the coefficient calculation unit 104 calculates the correction operation coefficient $a_n$-$a_0$ for each chip, based on the measurement result at the test temperature in the test process.

Figure 8:
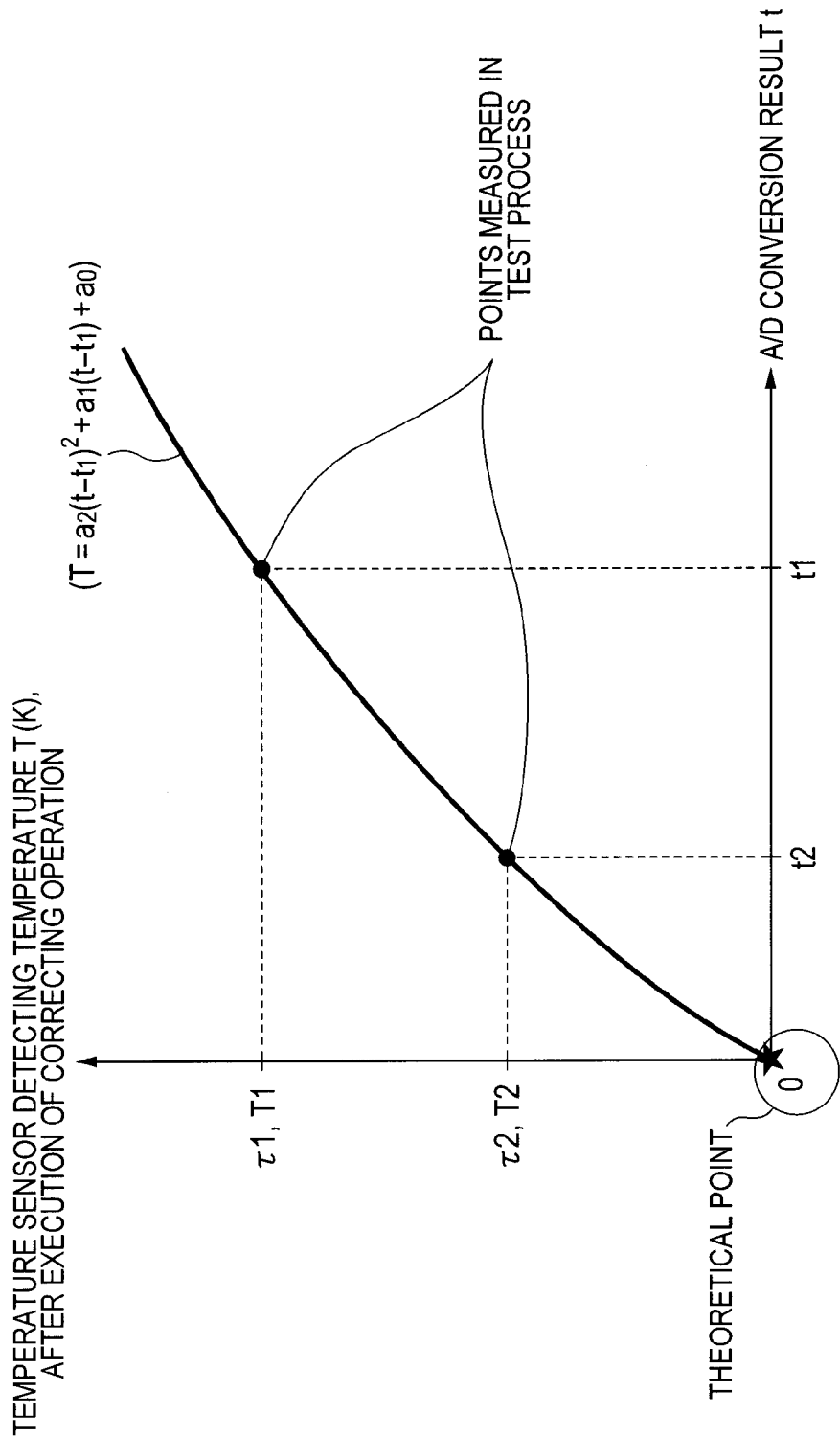
FIG. 8 is an explanatory diagram illustrating an example of the calculation method of correction operation coefficients $a_n$-$a_0$.

FIG. 8 is an explanatory diagram illustrating an example of the calculation method of the correction operation coefficients $a_n$-$a_0$. FIG. 8 illustrates the case of a second-order correction operation function as an example. In the figure, it is assumed that the A/D conversion result t is t1 at a test temperature τ1 and the A/D conversion result t is t2 at a test temperature τ2, in the test process before shipment.

Generally, in order to calculate an N-th order coefficient of an N-th order function, N+1 pieces of the measurement points are necessary. When one tries to calculate correction operation coefficients from two pieces of the measurement results (τ1, t1) and (τ2, t2) as illustrated in FIG. 8, it is possible to calculate the first-order correction operation coefficient $a_1$ and the zero-order correction operation coefficient $a_0$; however, it is not possible to calculate the second-order correction operation coefficient $a_2$. In order to calculate the second-order correction operation coefficient $a_2$, one more piece of the measurement result (τ3, t3) is necessary. Accordingly, in Embodiment 1, paying attention to the point that the limiting value of the A/D conversion result t converges to "0" at the absolute zero (T→0) theoretically, the N-th order correction operation coefficient is calculated, based on N+1 pieces of the A/D conversion results t which include N pieces of the measured values at N points of the test temperature and the theoretical value at the absolute zero. For example, in the case of FIG. 8, the correction operation coefficients $a_2$-$a_0$ are obtained by solving the simultaneous equations which are derived by substituting the measurement results (τ1, t1), (τ2, t2), and the theoretical value (0, 0) into Equation 11 described above. Specifically, they are expressed by Equation 12-Equation 14 as follows.

$$a_2 = \frac{t_1 \tau_2 - t_2 \tau_1}{t_1 t_2 (t_2 - t_1)} \quad \text{[Equation 12]}$$

$$a_1 = \frac{t_1^2 \tau_2 + \{(t_2 - t_1) - t_1\} t_2 \tau_1}{t_1 t_2 (t_2 - t_1)} \quad \text{[Equation 13]}$$

$$a_0 = \tau_1 \quad \text{[Equation 14]}$$

Accordingly, all the three correction operation coefficients can be determined by performing the measurement at two points of the test temperature.

Figure 9:
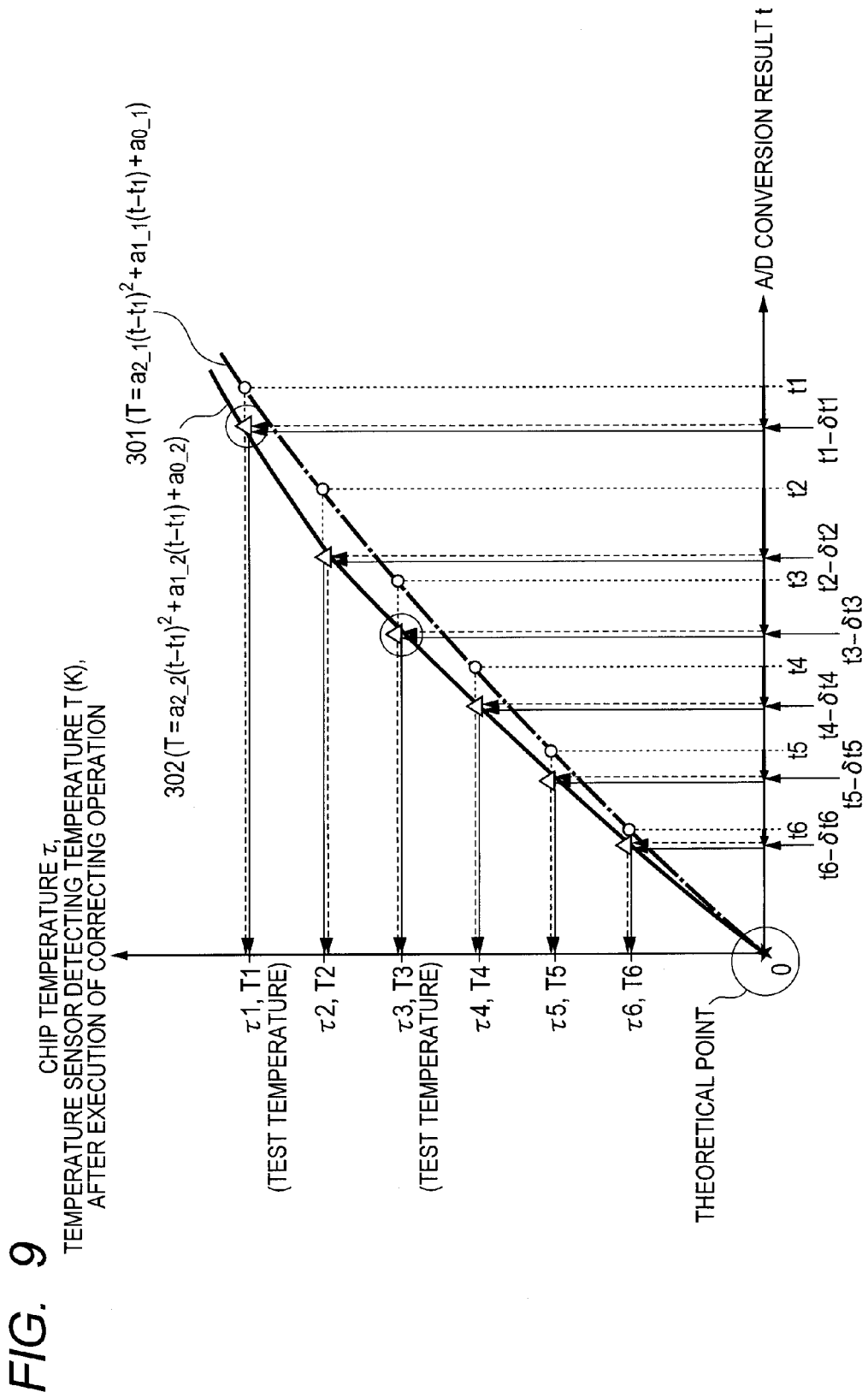
FIG. 9 is an explanatory diagram illustrating a correction operation function when there are variations in characteristics of the microcomputer 1.

FIG. 9 is an explanatory diagram illustrating a correction operation function when there are variations in characteristics of the microcomputer 1. In FIG. 9, a circle indicates a corresponding point of the A/D conversion result t in the ideal state with no variations in the process and the actual chip temperature τ, and a curve attached with a reference symbol 301 is a correction operation function in the ideal state with no variations in the process. A triangle indicates a corresponding point of the measured value of the A/D conversion result t and actual chip temperature τ, and a curve attached with a reference symbol 302 is a correction operation function based on the measured value.

For example, when the value of the A/D conversion result t is (t1−δt1) at a test temperature τ1 and the value of the A/D conversion result t is (t3−δt3) at a test temperature τ3 in the test process of the microcomputer 1, the coefficient calculation unit 104 calculates correction operation coefficients $a_{2\_2}$, $a_{1\_2}$ and $a_{0\_2}$ by the method described above, using the measured values ($\tau 1$, $t1-\delta t1$) and ($\tau 3$, $t3-\delta t3$) and the theoretical value (0, 0). Then, the correction operation unit 105 performs calculation using a correction operation function 302 ($a_{2\_2}(t-t1)^2 + a_{1\_2}(t-t1) + a_{0\_2}$) to which the calculated correction operation coefficients $a_{2\_2}$, $a_{1\_2}$, and $a_{0\_2}$ are applied, and outputs the temperature detection result T.

In this way, by using the measured values, even when the A/D conversion result t to the chip temperature $\tau$ shifts from the ideal value due to process variations, the correction operation function corresponding to the characteristics of the chip can be determined. Accordingly, it is possible to reduce the error between the chip temperature $\tau$ and the temperature detection result T.

In Equation 11-Equation 14 described above, it is assumed that the A/D conversion result t' at the test temperature is the A/D conversion result t1 at the test temperature $\tau 1$. However, the present invention is not restricted to the case. Since Equation 11 is only an approximate function, an error may become large as the temperature departs from the test temperature. Therefore, it is preferable to determine the test temperature t', corresponding to the temperature range in which the accuracy enhancement of the temperature detection is desired. For example, when it is desired to enhance the temperature detection accuracy in the neighborhood of the temperature t2, the A/D conversion result t' of Equation 11 may be preferably set as the A/D conversion result t2 at the test temperature $\tau 2$.

Figure 10:
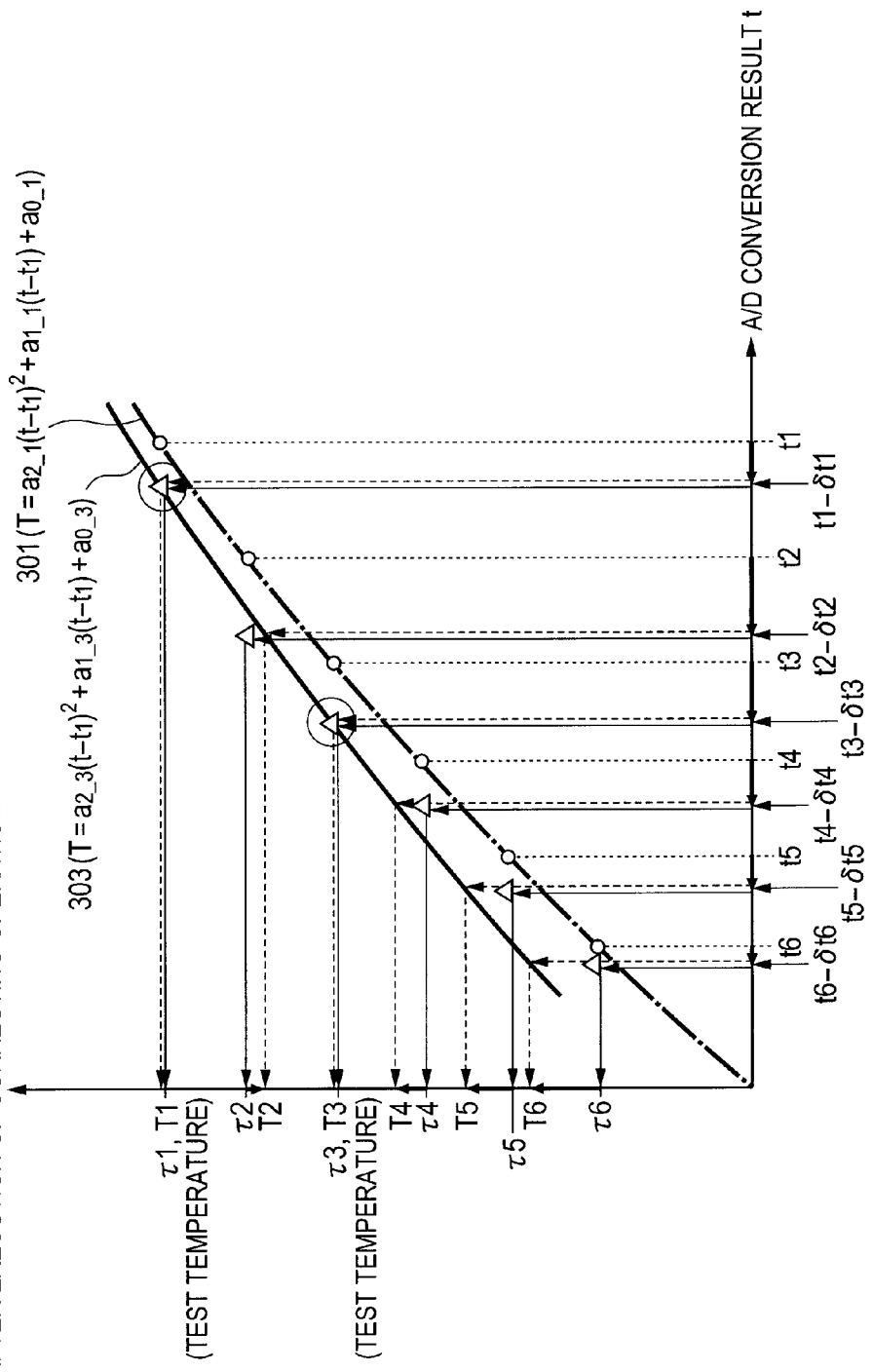
FIG. 10 is an explanatory diagram in determining a correction operation function, without using a theoretical value.

FIG. 10 illustrates a comparative example in which the correction operation function is determined without using the theoretical value. In FIG. 10, a circle indicates a corresponding point of the A/D conversion result t in the ideal state with no variations in the process and the actual chip temperature $\tau$, and a curve attached with a reference symbol 301 is a correction operation function in the ideal state with no variations in the process. A triangle indicates a corresponding point of the measured value of the A/D conversion result t and the actual chip temperature $\tau$, and a curve attached with a reference symbol 303 is a correction operation function based on the measured value.

For example, when the value of the A/D conversion result t is ($t1-\delta t1$) at a test temperature $\tau 1$ and the value of the A/D conversion result t is ($t3-\delta t3$) at a test temperature $\tau 3$, the correction operation coefficients which can be calculated from the measured value ($\tau 1$, $t1-\delta t1$) and ($\tau 3$, $t3-\delta t3$) without using the theoretical value (0, 0) are a first-order correction operation coefficient $a_{1\_3}$ and a zero-order correction operation coefficient $a_{0\_3}$. A second-order correction operation coefficient $a_{2\_3}$ cannot be computed because of the insufficient measurement points; therefore, a value predicted in advance in the simulation etc. is used for it. The correction operation unit 105 performs calculation using a correction operation function 303 ($a_{2\_3}(t-t1)^2 + a_{1\_3}(t-t1) + a_{0\_3}$) to which the correction operation coefficients $a_{2\_2}$, $a_{1\_2}$, and $a_{0\_2}$ are applied, and calculates the temperature detection result T. According to this, as illustrated in FIG. 10, at the test temperatures $\tau 1$ and $\tau 3$, error from the correcting operation results T1 and T3 can be made small, however, as the point departs from the test temperature, the error between the chip temperature $\tau$ and the correcting operation result (temperature detection result) T increases, leading to insufficient enhancement of the accuracy of the temperature sensor. On the other hand, the microcomputer 1 according to the present embodiment calculates the N-th correction operation coefficient from N pieces of the measured values, by utilizing the theoretical value at the absolute zero in addition to the measured value at the test temperature. Accordingly, only by testing at N points of temperature in the test process before shipment, an effect equivalent to the case of testing at N+1 points of temperature is obtained, and it becomes possible to correct the variations in the temperature sensor 10 with a greater accuracy.

Next, the procedure of the correcting operation by the microcomputer 1 is explained.

Figure 11:
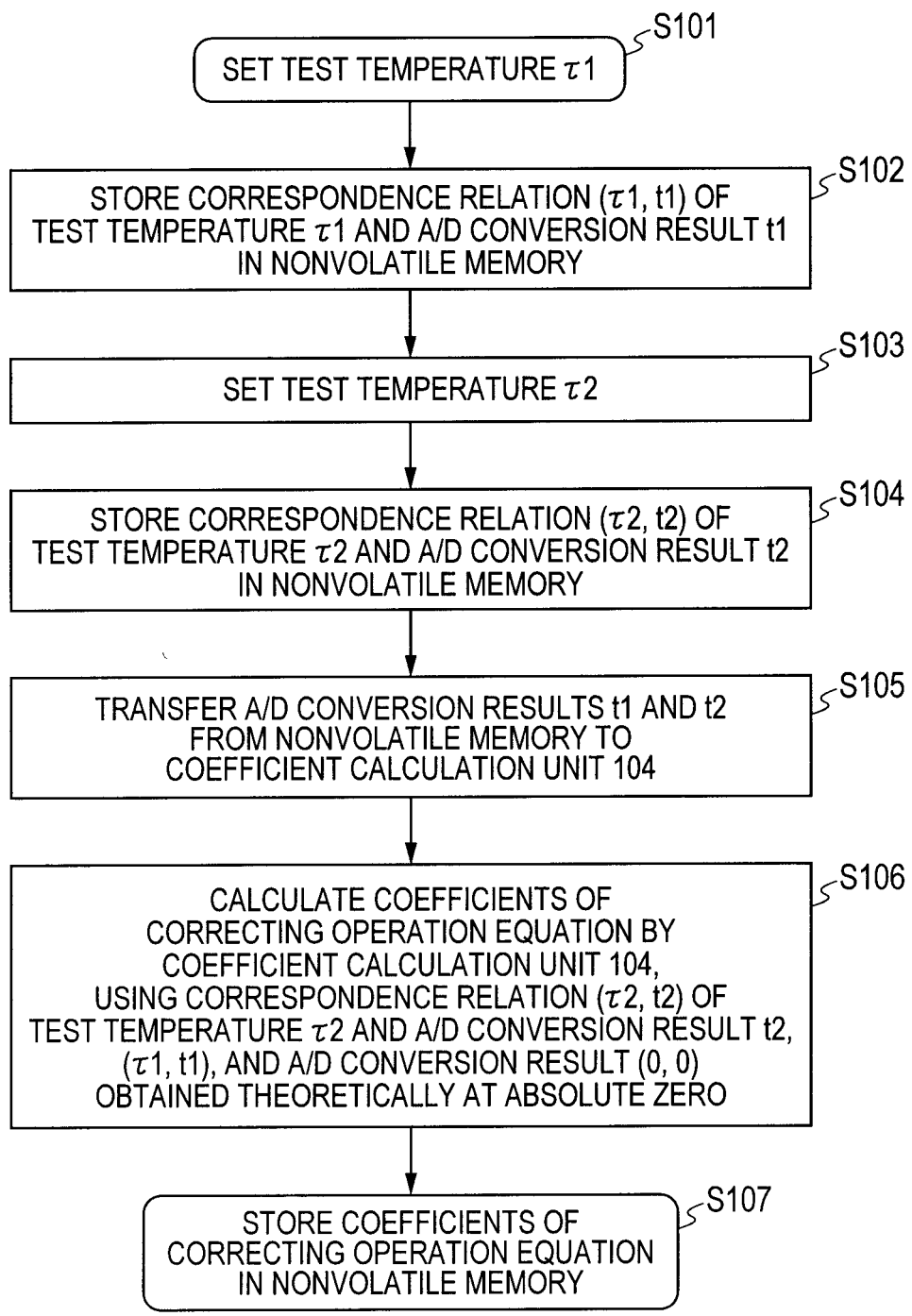
FIG. 11 is a flow chart illustrating an example of calculation of correction operation coefficients.

FIG. 11 is a flow chart illustrating an example of calculation of the correction operation coefficients. FIG. 11 illustrates a process flow in calculating the correction operation coefficients in a test before product shipment.

For example, after installing the microcomputer 1 as a measuring target in a tester, a test temperature is set at $\tau 1$ (S101). When the temperature is stabilized, in response to the request for the temperature detection from the CPU 30 and others, the temperature sensor 10 measures temperature and a measurement result ($\tau 1$, $t1$) is stored in the nonvolatile memory 502 (S102). Next, the tester sets the test temperature at $\tau 2$ (S103). Same as in Step S102, in response to the request for the temperature detection from the CPU 30 and others, the temperature sensor 10 measures temperature and a measurement result ($\tau 2$, $t2$) is stored in the nonvolatile memory (S104). Then, the measurement results ($\tau 1$, $t1$) and ($\tau 2$, $t2$) stored in the nonvolatile memory 502 are transferred to the coefficient calculation unit 104 (S105). The coefficient calculation unit 104 calculates correction operation coefficients $a_2$, $a_1$, and $a_0$ by the method described above using the transferred measurement results ($\tau 1$, $t1$) and ($\tau 2$, $t2$) and the theoretical value (0, 0) (S106). The calculated correction operation coefficients $a_2$, $a_1$, and $a_0$ are stored in the nonvolatile memory 502 (S107).

Figure 12:
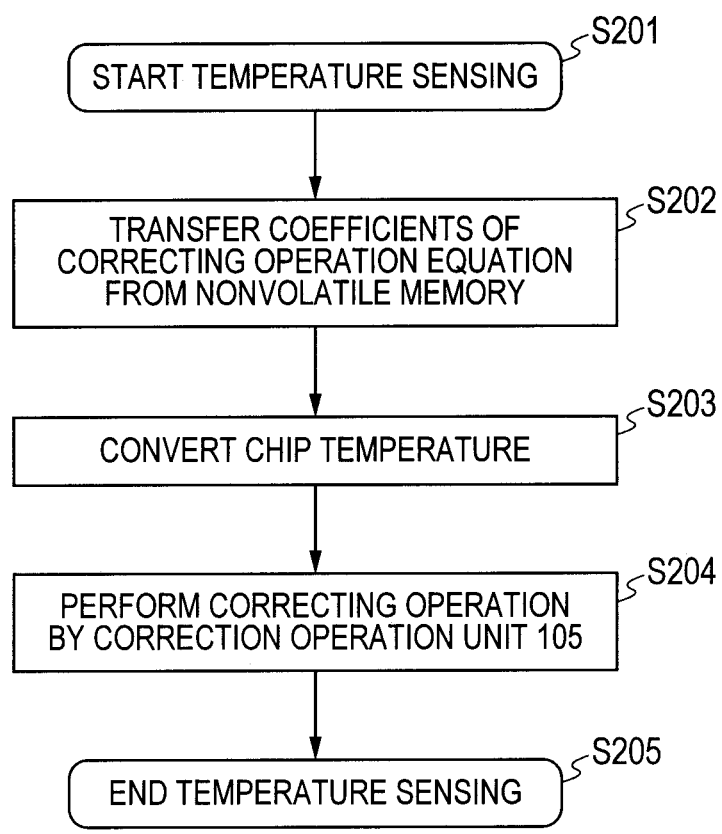
FIG. 12 is a flow chart illustrating an example of a correcting operation.

FIG. 12 is a flow chart illustrating an example of the correcting operation. FIG. 12 illustrates the process flow in performing the correcting operation at the time of the actual operation after the product shipment.

For example, in response to the request for the temperature detection from the CPU 30 and others, the temperature sensor 10 starts temperature measurement (S201). First, the temperature sensor 10 reads the correction operation coefficients $a_2$, $a_1$, and $a_0$ from the nonvolatile memory 502 (S202). The read correction operation coefficients $a_2$, $a_1$, and $a_0$ are held at a register, for example, in the correction operation unit 105. Next, the sensor unit 100 performs temperature measurement and outputs the A/D conversion result t (S203). The correction operation unit 105 inputs the A/D conversion result t, and performs the correcting operation using the correction operation coefficients $a_2$, $a_1$, and $a_0$ held at the register (S204). Then, the correction operation unit 105 outputs the correcting operation result T as the temperature detection result, and the processing of the temperature measurement is terminated (S205). In the procedure, the order of Step S202 and Step S203 may be changed or Step S202 and Step S203 may be performed to the same timing.

Figure 13:
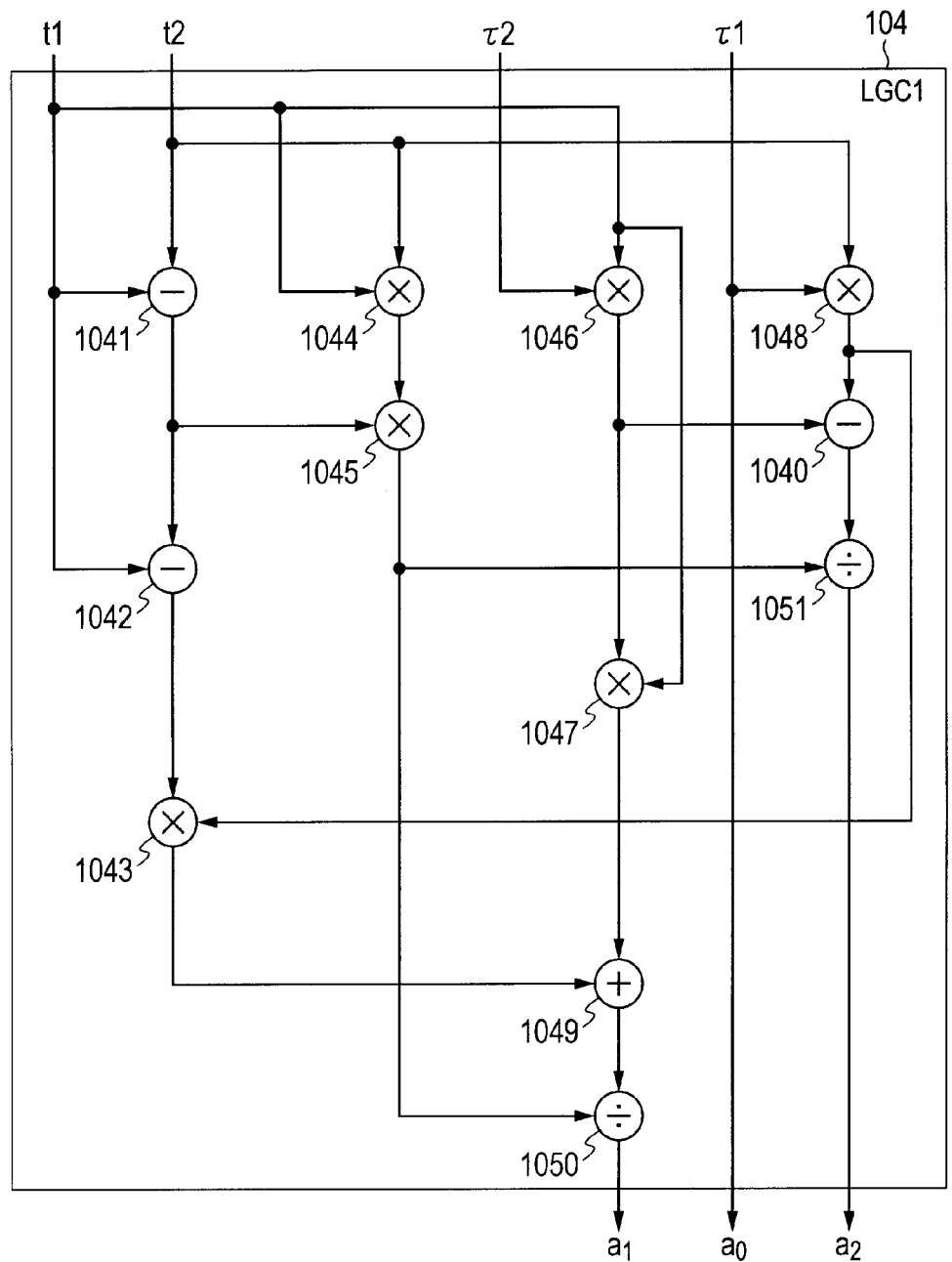
FIG. 13 is an explanatory diagram illustrating a concrete configuration example of a coefficient calculation unit 104 for realizing calculation of the correction operation coefficients.

FIG. 13 illustrates a concrete configuration example of the coefficient calculation unit 104 for realizing calculation of the correction operation coefficients. The coefficient calculation unit 104 is configured with an exclusive logic circuit which comprises subtractors 1040-1042, multipliers 1043-1048, an adder 1049, dividers 1050 and 1051, etc. The coefficient calculation unit 104 also comprises a register, etc. (not shown) for holding the measured results ($\tau 1$, $t1$) and ($\tau 2$, $t2$), etc. which are transferred from the nonvolatile memory 502.

FIG. 13 illustrates an configuration example of the logic circuit for realizing calculation by Equation 12-Equation 14 described above. If the arithmetic function carried out by the coefficient calculation unit 104 is realized by program execution by a microcomputer, when the chip temperature of the microcomputer 1 becomes high, it is likely that the microcomputer which performs the calculation may fall into a runaway state, and that the correct operation result may no longer be obtained. However, realizing the arithmetic function with the exclusive logic circuit allows the stable operation even at a high temperature.

Figure 14:
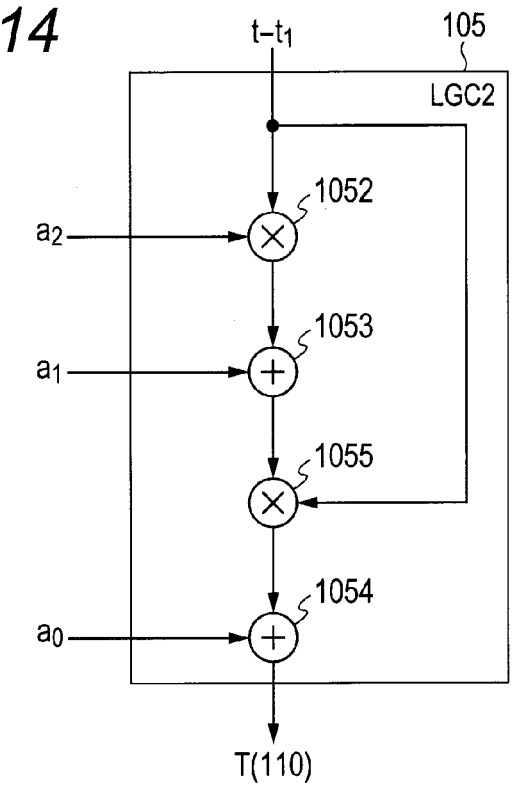
FIG. 14 is an explanatory diagram illustrating a concrete configuration example of a correction operation unit 105 for realizing the correcting operation.

FIG. 14 illustrates a concrete configuration example of the correction operation unit 105 for realizing the correcting operation. The correction operation unit 105 is configured with an exclusive logic circuit which comprises multipliers 1052 and 1055 and adders 1053 and 1054, etc.

FIG. 14 illustrates the configuration example of the logic circuit for realizing calculation using the second-order correction operation function described above (Equation 11). If the arithmetic function carried out by the correction operation unit 105 is realized by the program execution by a microcomputer, when the chip temperature of the microcomputer 1 becomes high, it is likely that the microcomputer which performs calculation may fall into a runaway state, and that the correct operation result may no longer be obtained. However, realizing the arithmetic function with the exclusive logic circuit allows the stable operation even at a high temperature.

Figure 15:
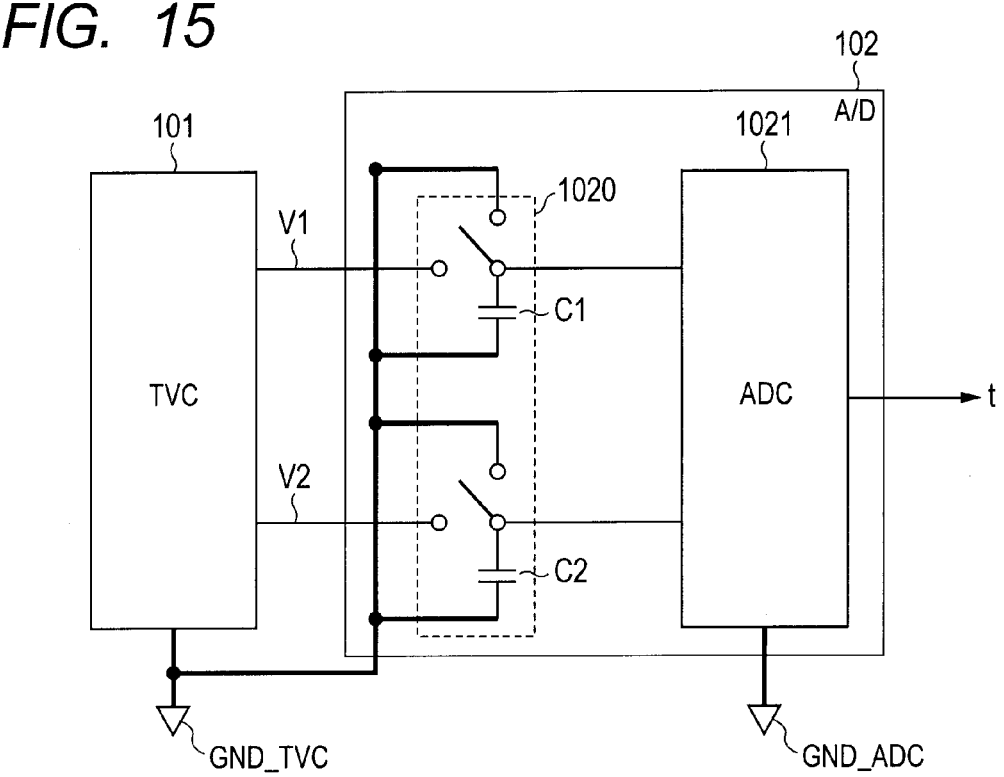
FIG. 15 is an explanatory diagram illustrating a concrete configuration example of an A/D conversion unit 102 for realizing temperature measurement.

FIG. 15 illustrates a concrete configuration example of the A/D conversion unit 102 for realizing the temperature measurement. The A/D conversion unit 102 comprises an input stage 1020 and an A/D converter circuit (ADC) 1021 for performing A/D conversion. The input stage 1020 is provided with sampling capacitors C1 and C2 for holding input voltages, and switches. The A/D conversion unit 102 holds the reference voltages V1 and V2 in the sampling capacitors C1 and C2, and the A/D converter circuit 1021 samples the voltages held in the capacitors C1 and C2; thereby the A/D conversion unit 102 performs A/D conversion and outputs the A/D conversion result t.

When a potential difference is induced under the influence of a noise between the reference potential (ground voltage GND_TVC) of the temperature-voltage conversion circuit 101 and the reference potential (ground voltage GND_ADC) of the A/D conversion unit 102, for example, the above-described precondition that the limiting value of the reference voltage V1 at the absolute zero (T→0) is "0" no longer holds when seen from the ground voltage GND_ADC of the A/D converter circuit 1021. Accordingly, it is likely that the present fact may become an error factor of the temperature detection result T. In order to suppress the influence of a noise, at the time of the refresh operation of the sampling capacitors C1 and C2, the sampling capacitors are refreshed not by the ground voltage GND_ADC of the A/D converter circuit 1021 but by the ground voltage GND_TVC of the temperature-voltage conversion circuit 101. That is, the sensor unit 100 is laid out so that one end of the sampling capacitor is coupled to the node of the ground voltage GND_TVC and the other end of the sampling capacitor is coupled to the node of the ground voltage GND_TVC at the time of refreshment.

Figure 16:
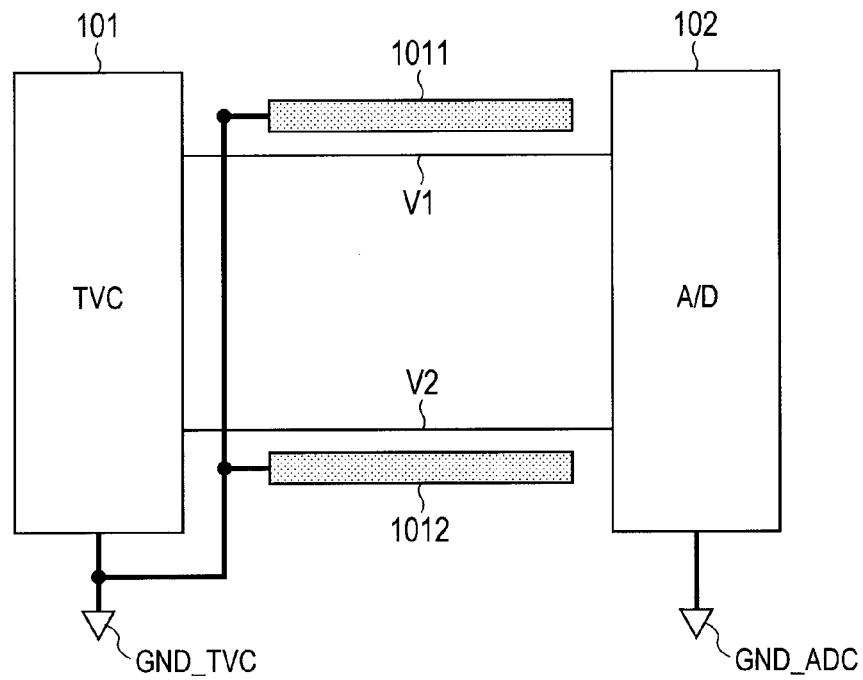
FIG. 16 is an explanatory diagram illustrating an example of the method of electrostatic shielding of the reference voltages V1 and V2.
Figure 17:
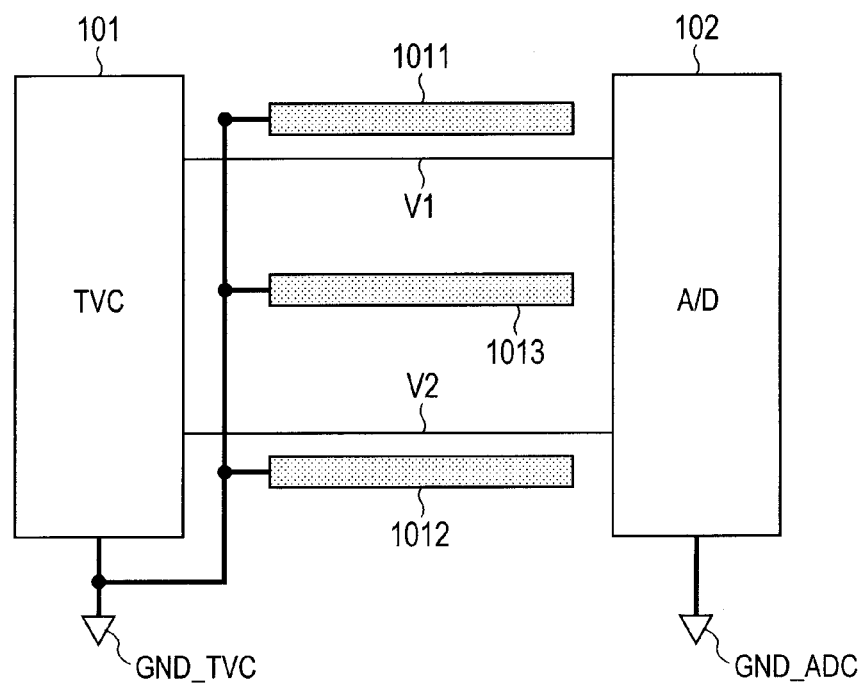
FIG. 17 is an explanatory diagram illustrating another example of the method of electrostatic shielding of the reference voltages V1 and V2.

FIG. 16 and FIG. 17 illustrate an example of the method of electrostatic shielding of the reference voltages V1 and V2.

In FIG. 16, a shielding wire 1011 is installed so as to be disposed in parallel with a signal line through which the reference voltage V1 is supplied, and a shielding wire 1012 is installed so as to be disposed in parallel with a signal line through which the reference voltage V2 is supplied. The shielding wires 1011 and 1012 are supplied with the ground voltage GND_TVC of the temperature-voltage conversion circuit 101. Accordingly, the reference voltages V1 and V2 and the voltage of the shielding wires 1011 and 1012 swing in phase and with the same amplitude even when a noise is superimposed; therefore, there is no movement of a charge between the signal lines of the reference voltages V1 and V2 and the shielding wires 1011 and 1012. Accordingly, it is possible to reduce the influence of a noise. Therefore, it is possible to perform the temperature detection with a greater accuracy.

In FIG. 17, in addition to the shielding wires 1011 and 1012, a shielding wire 1013 is installed between the signal line through which the reference voltage V1 is supplied and the signal line through which the reference voltage V2 is supplied. The shielding wires 1011, 1012, and 1013 are supplied with the ground voltage GND_TVC of the temperature-voltage conversion circuit 101. Accordingly, it is possible to reduce more the influence of a noise. It is also preferable to install shielding layers in the lower layer and upper layer of the wirings of V1 and V2 and the shielding wires 1011-1013. Accordingly, it is possible to reduce much more the influence of a noise.

It is clear from the above that, in the microcomputer 1 according to Embodiment 1, the theoretical value at the absolute zero is utilized in addition to the measured values at test temperatures; therefore, only by testing at N points of temperature, an effect equivalent to the case of testing at N+1 points of temperature is obtained. Accordingly, it is possible to attain the accuracy enhancement of the temperature measurement by the temperature sensor 10, without further increase in the test process.

The above explanation has shown the method in which the calculation of the correction operation coefficients $a_n$-$a_0$ is performed in the testing phase before shipping. However, it is not restricted to the method, and it is also preferable to adopt a method in which the calculation is performed at the time of the actual operation after shipment. For example, in the testing phase before shipment, the A/D conversion result t at the test temperature is stored in the nonvolatile memory 502. Then, at the time of the actual operation after shipment, when the request for temperature measurement is made from the CPU 30 and others, the coefficient calculation unit 104 reads the measurement result stored in the nonvolatile memory 502. The coefficient calculation unit 104 calculates the correction operation coefficients based on the measurement result read and the theoretical value, and transfers the calculation result to the correction operation unit 105. According to the method, it is possible to attain the accuracy enhancement of the temperature measurement as is the case with the above method, and it is possible to reduce the test time by omitting the processing of the coefficient calculation in the test process. The calculation of the correction operation coefficients by the coefficient calculation unit 104 may not be performed every time the request for the temperature measurement from the CPU 30 and others is made. However, after the microcomputer 1 starts and reset is canceled for example, the coefficient calculation unit 104 may perform the calculation of the correction operation coefficients, and may hold the correction operation coefficients in a register, etc. of the correction operation unit 105.

Alternatively, without using the coefficient calculation unit 104, the correction operation coefficients $a_n$-$a_0$ may be calculated by a program execution device (for example, a PC etc.) such as a tester, in the testing phase before shipment, and the correction operation coefficients $a_n$-$a_0$ calculated may be stored in the nonvolatile memory 502. The calculation method of the coefficients is the same as the one carried out by the coefficient calculation unit 104. According to the method, without increasing the test temperatures as is the above case, it is possible to attain the accuracy enhancement of the temperature measurement of the temperature sensor 10, and it is also possible to contribute to the reduction of the chip area of the microcomputer 1 because the coefficient calculation unit 104 becomes unnecessary.

Embodiment 2

Figure 18:
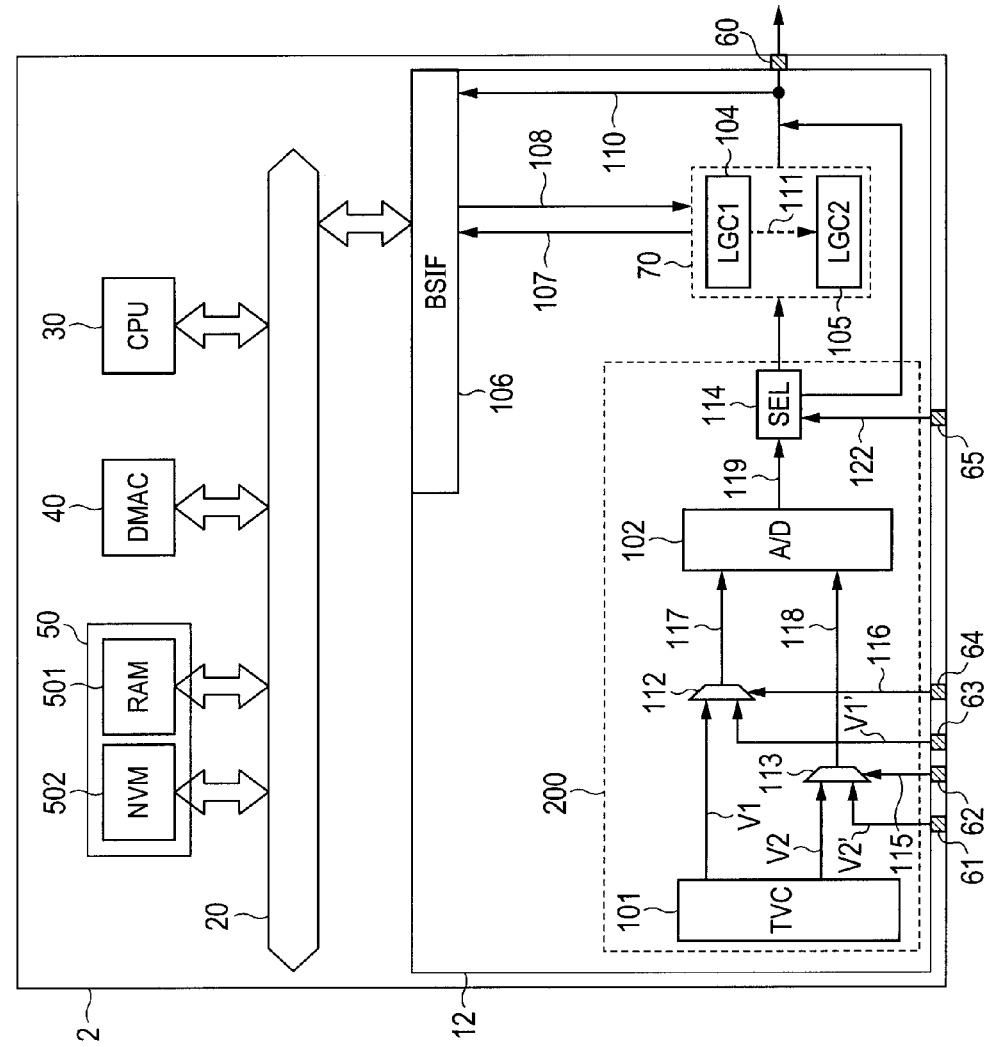
FIG. 18 is a block diagram illustrating an example of a microcomputer with a built-in temperature sensor for performing data processing, etc. for a vehicle, according to Embodiment 2.

FIG. 18 is a block diagram illustrating an example of a microcomputer with a built-in temperature sensor, for performing data processing, etc. for a vehicle, according to Embodiment 2. Although not limited in particular, the microcomputer 2 illustrated in FIG. 18 is formed over a semiconductor substrate like single crystal silicon, by the well-known CMOS integrated circuit manufacturing technology.

As described above, in order to enhance the accuracy of the temperature sensor 12, it is necessary to calculate the correction operation coefficients $a_n$-$a_0$ and to perform the correcting operation. However, it is necessary to test operation of each functional block in the preceding stage and to check the existence or nonexistence of operation abnormality. Accordingly, for ease of the operation test of each functional block, the microcomputer 2 according to Embodiment 2 further comprises a functional block for the operation test, in addition to the function provided in the microcomputer 1 according to Embodiment 1. Specifically, the microcomputer 2 further comprises input selectors 112 and 113, an output selector 114, and input-output terminals 61-65. In FIG. 18, the same symbol is attached to the same component as the microcomputer 1, and the detailed explanation thereof is omitted.

The input selector 112 selects and outputs either the reference voltage V1 outputted by the temperature-voltage conversion circuit 101, or an external input voltage V1' inputted from the exterior via the terminal 63, in response to an input selection signal 116 inputted from the exterior via the terminal 64. The output voltage 117 is inputted into the A/D conversion unit 102. The input selector 113 selects and outputs either the reference voltage V2 outputted by the temperature-voltage conversion circuit 101, or an external input voltage V2' inputted from the exterior via the terminal 61, in response to an input selection signal 115 inputted from the exterior via the terminal 62. The output voltage 118 is inputted into the A/D conversion unit 102.

The output selector 114 switches the output destination of the A/D conversion result 119, in response to an output selection signal 122 inputted from the exterior via the terminal 65. Specifically, either an input terminal of the coefficient calculation unit 104 and the correction operation unit 105 or an output signal line of the correction operation unit 105 is selected as the output destination of the A/D conversion result 119.

The test method using the input selectors 112 and 113 and the output selector 114 is explained.

The test method of the A/D conversion unit 102 is as follows. For example, the input selection signals 115 and 116 and the output selection signal 122 are set up so that the input selectors 112 and 113 select external input voltages V1' and V2', and the output selector 114 outputs the A/D conversion result T bypassing the logical unit 70. At this time, it is possible to determine whether the A/D conversion unit 102 is operating normally, by comparing the A/D conversion result t (119) outputted and the value of V1'/V2' predicted from the external input voltages V1' and V2'.

The test method of the logical unit 70 (the coefficient calculation unit 104 and the correction operation unit 105) is as follows. For example, the output selection signal 122 is set up so that the output selector 114 may input the A/D conversion result 119 into the logical unit 70. When it has been checked that the A/D conversion unit 102 is operating normally in the above-described test of the A/D conversion unit 102, it is possible to determine whether the coefficient calculation unit 104 and the correction operation unit 105 are operating normally, by comparing the correcting operation result T and the predicted value of the operation result.

The test method of the temperature-voltage conversion circuit 101 is as follows. The input selection signals 115 and 116 are set up so that the input selectors 112 and 113 may select the reference voltages V1 and V2, for example. When it has been checked that the A/D conversion unit 102 and the logical unit 70 are operating normally in the above-described test of the A/D conversion unit 102 and the logical unit 70, it is possible to determine whether the reference voltage V1 is outputted normally, by comparing the difference between the A/D conversion result 119 when the input voltage is the reference voltage V1 and the A/D conversion result 119 when the input voltage is the external input voltage V1'. The same applies to the reference voltage V2. Another test method is also preferable, in which the input selector 112 is designed so as to output the reference voltage V1 to the terminal 63, and the reference voltage V1 is monitored outside the chip for determining the normal operation. The same applies to the input selector 113.

It is also possible to utilize the output selector 114 for uses other than the test. For example, when a high accuracy of the temperature detection is not needed for temperature sensor 12, the output selection signal 122 is set up so that the output selector 114 may output the A/D conversion result T, bypassing the logical unit 70. In this case, a switch signal is inputted, for example from the CPU 30 and others, instead of inputting the output selection signal 122 from the exterior. At this time, the logical unit 70 is disabled and the output thereof is set to high impedance. Accordingly, although the accuracy enhancement of the temperature detection is not attained, the power consumption of the microcomputer 1 can be reduced because the logical unit 70 does not operate.

It is clear from the above that, in the microcomputer 2 according to Embodiment 2, as is the case with Embodiment 1, it is possible to attain the accuracy enhancement of the temperature measurement without increasing the process of the test, and it is possible to easily perform the operation test of each functional block.

Embodiment 3

Figure 19:
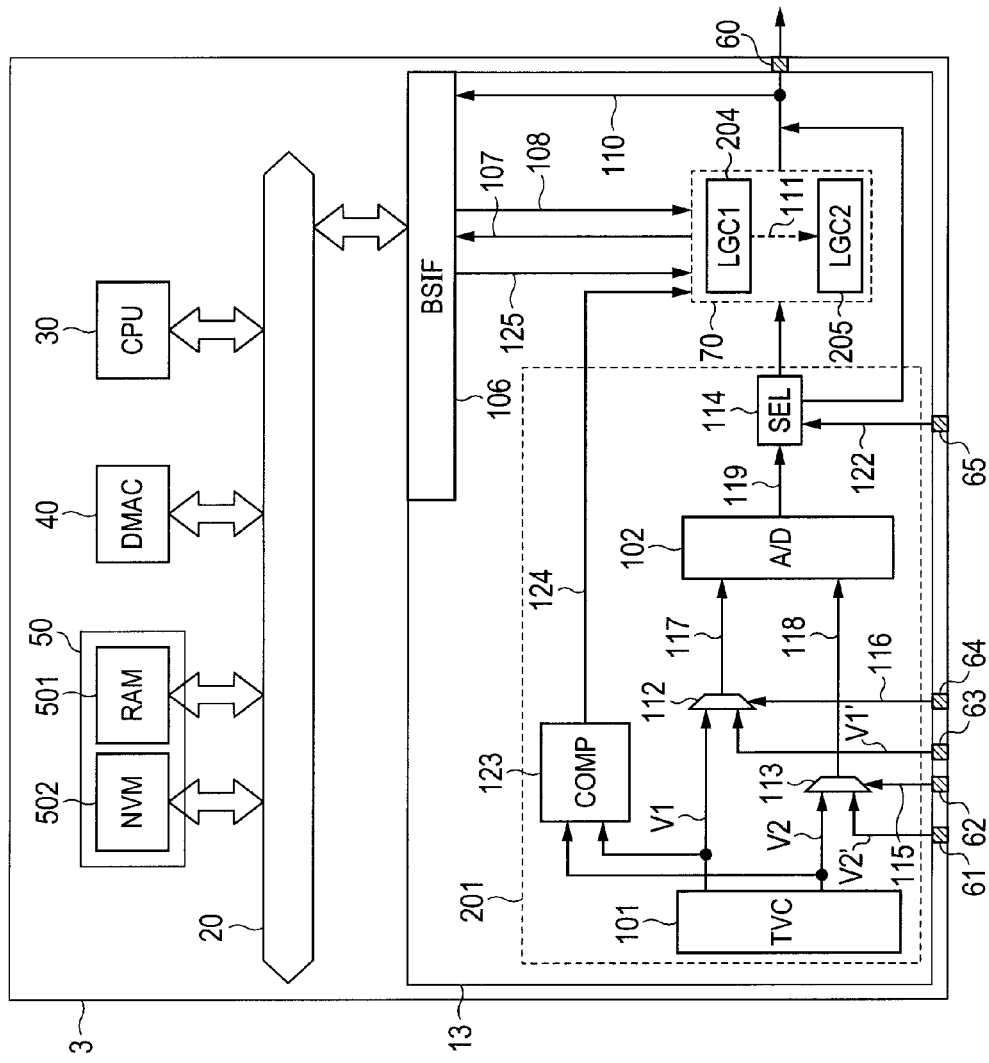
FIG. 19 is a block diagram illustrating an example of a microcomputer with a built-in temperature sensor for performing data processing, etc. for a vehicle, according to Embodiment 3.

FIG. 19 is a block diagram illustrating an example of a microcomputer with a built-in temperature sensor, for performing data processing, etc. for a vehicle, according to Embodiment 3. Although not limited in particular, the microcomputer 3 illustrated in FIG. 19 is formed over a semiconductor substrate like single crystal silicon, by the well-known CMOS integrated circuit manufacturing technology.

In addition to the function provided in the microcomputer 2 according to Embodiment 2, the microcomputer 3 is provided with the function for switching the correction operation function depending on a temperature range. Specifically, the microcomputer further comprises a comparator 123 for determining the temperature range. In FIG. 19, the same symbol is attached to the same component as the microcomputers 1 and 2, and the detailed explanation thereof is omitted.

As described above, in order to enhance the accuracy of the temperature sensor 12, it is necessary to calculate the correction operation coefficients $a_n$-$a_0$ and to perform the correcting operation. However, for the further reduction of the test cost, a consideration is given on the case where the test is performed at only one point of temperature τ1, and a correction operation function is used. In this case, by using two points, the measurement result (t1, τ1) and the theoretical value (0, 0), it is possible to calculate the first-order correction operation coefficient $a_1$ and the zero-order correction operation coefficient $a_0$ among three correction operation coefficients $a_2$, $a_1$, and $a_0$ of the second-order function. However, it is not possible to calculate the second-order correction operation coefficient $a_2$. Therefore, the second-order correction operation coefficient $a_2$ uses a value predicted by the circuit simulation etc. Accordingly, as described with reference to FIG. 10, it is likely that the temperature accuracy may deteriorate at a temperature departing from the test temperature τ1. In particular, the present influence will become still more notable when the specification of the operational temperature range demanded for the temperature sensor becomes a wide range. Accordingly, in the microcomputer 3, the correcting operation is performed by switching the second-order correction operation coefficient $a_2$ depending on the temperature range.

Figure 20:
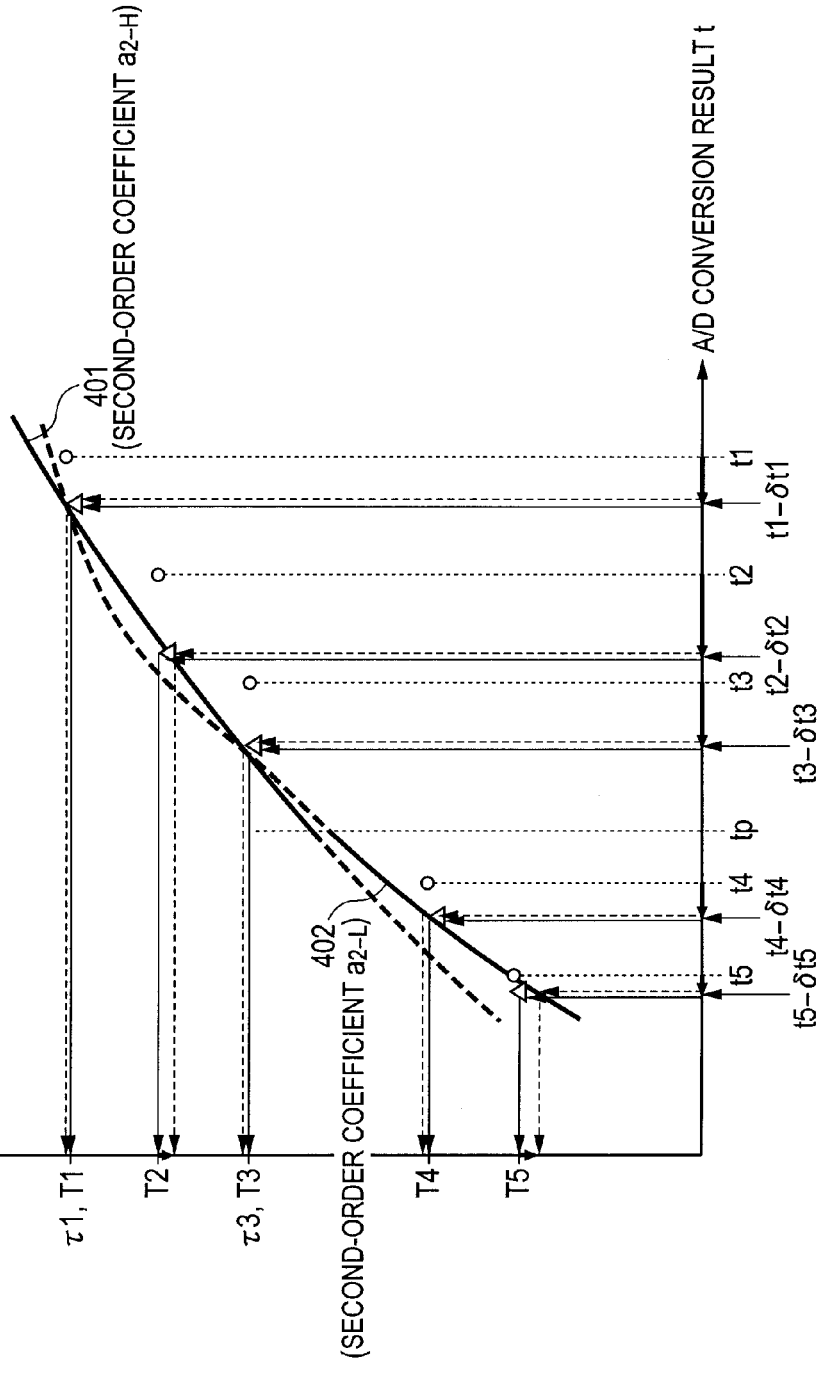
FIG. 20 is an explanatory diagram illustrating an example of a correction operation function of which the correction operation coefficients are switched corresponding to a temperature range.

FIG. 20 is an explanatory diagram illustrating an example of the correction operation function of which the correction operation coefficients are switched corresponding to a temperature range. In FIG. 20, a circle indicates a corresponding point of the A/D conversion result t in the ideal state with no variations in the process and the actual chip temperature τ, and a triangle indicates a corresponding point of the A/D conversion result t of the measured value, and the actual chip temperature τ. The curve attached with a reference symbol 401 is a correction operation function in the temperature range higher than the temperature corresponding to the A/D conversion result tp, and the curve attached with a reference symbol 402 is a correction operation function in the temperature range lower than the temperature corresponding to the A/D conversion result tp.

As illustrated in FIG. 20, the correcting operation result T of the correction operation function 401 deviates from the measured value more significantly as the temperature becomes low, and the correcting operation result T of the correction operation function 402 deviates from the measured value more significantly as the temperature becomes high. Accordingly, with a border at the temperature corresponding to the A/D conversion result tp, on the high temperature side, the correction operation function 401 of a second-order correction operation coefficient $a_{2\_H}$ is used, and on the low temperature side, the correction operation function 402 of a second-order correction operation coefficient $a_{2\_L}$ is used. The values predicted by the circuit simulation etc. are used for the second-order correction operation coefficients $a_{2\_H}$ and $a_{2\_L}$. According to the present device, even when the measurement points are reduced in the test process, it is possible to improve the accuracy of the temperature detection compared with the method described above with reference to FIG. 10.

When the temperature range is separated into two temperature ranges: a range from a low temperature to the normal temperature and a range from the normal temperature to a high temperature, it is preferable to set the temperature corresponding to the A/D conversion result tp as the normal temperature (for example, 25° C.).

Figure 21:
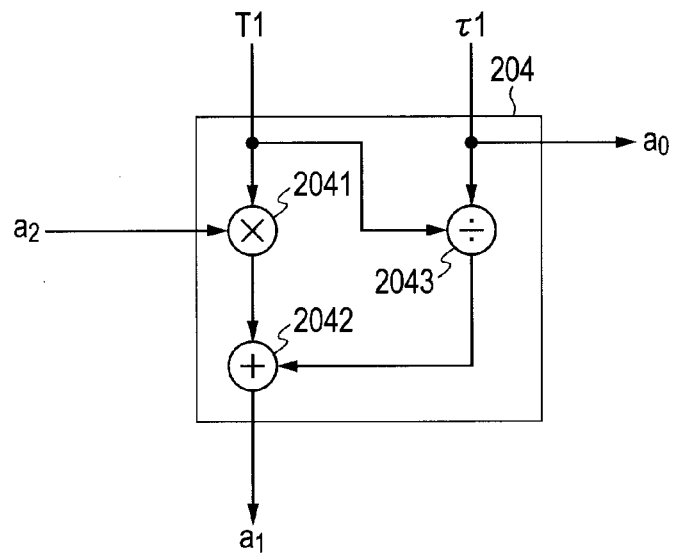
FIG. 21 is an explanatory diagram illustrating a concrete configuration example of a coefficient calculation unit 204 for realizing calculation of the correction operation coefficients.

FIG. 21 illustrates a concrete configuration example of the coefficient calculation unit 204 for realizing calculation of the correction operation coefficients of FIG. 20. The coefficient calculation unit 204 is configured with an exclusive logic circuit which comprises a multiplier 2041, an adder 2042, and a divider 2043. The coefficient calculation unit 204 also comprises a register etc. (not shown) to hold the measured result (τ1, t1) etc. transferred from the nonvolatile memory 502, for example. FIG. 21 illustrates a configuration example of the logic circuit for calculating the first-order correction operation coefficient $a_1$ and the zero-order correction operation coefficient $a_0$, with a fixed value for the second-order correction operation coefficient $a_2$. The equations for calculating the first-order correction operation coefficient $a_1$ and the zero-order correction operation coefficient $a_0$ are obtained by substituting the measured result (τ1, t1) and the theoretical value (0, 0) into Equation 11 and solving the equation. They are expressed by Equation 15 and Equation 16 as follows.

$$a_1 = a_2 t_1 + \frac{\tau_1}{t_1} \qquad \text{[Equation 15]}$$

$$a_0 = \tau_1 \qquad \text{[Equation 16]}$$

Figure 22:
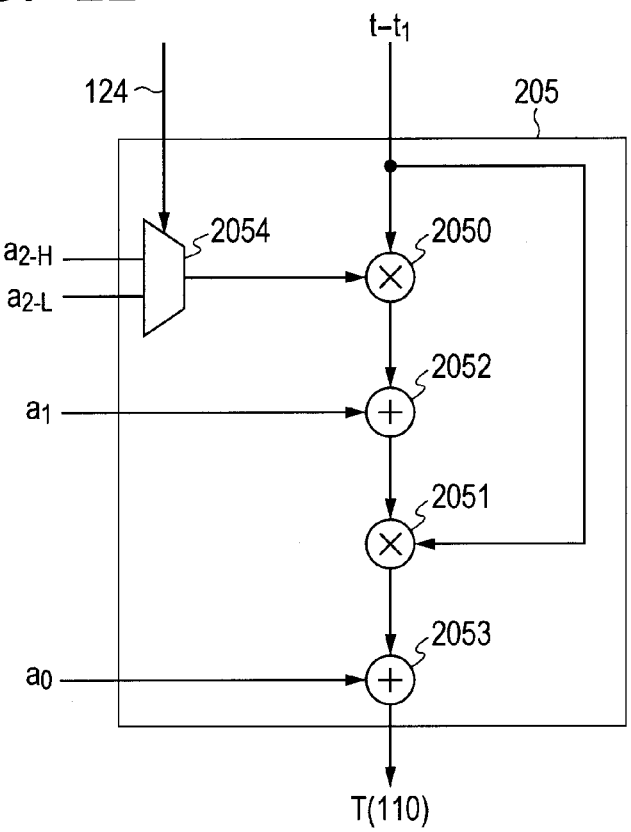
FIG. 22 is an explanatory diagram illustrating a concrete configuration example of a correction operation unit 205 for realizing the correcting operation.

FIG. 22 illustrates a concrete configuration example of the correction operation unit 205 for realizing the correcting operation of FIG. 20. The correction operation unit 205 is configured with an exclusive logic circuit which comprises multipliers 2050 and 2051, adders 2052 and 2053, and a coefficient selector 2054. In the figure, the logic circuit for realizing the calculation using the second-order correction operation function described above (Equation 11) is configured with the multipliers 2050 and 2051 and the adders 2052 and 2053. The second-order correction operation coefficient to be inputted into the multiplier 2050 is switched by the coefficient selector 2054. Specifically, the comparator 123 monitors the reference voltage V1 and the reference voltage V2 and reverses the logic of the switch signal 124 for example, when the voltage ratio V1/V2 reaches a value corresponding to the A/D conversion result tp. The coefficient selector 2054 outputs either the correction operation coefficient $a_{2\_H}$ or the correction operation coefficient $a_{2\_L}$ to the multiplier 2050 in response to the switch signal 124.

As described above, according to Embodiment 3, the second-order correction operation coefficient $a_2$ is switched depending on the temperature range when performing the correcting operation. Accordingly, even in a case where the number of points of the test temperature is reduced, it is possible to suppress deterioration of the accuracy of the temperature detection, and it is possible to attain further reduction of the test cost. Compared with the method of calculating three correction operation coefficients, the accuracy of the present method may be inferior due to the process variations of the reference voltages V1 and V2 and the influence of the characteristics of the comparator 123.

The above-described explanation has been made on the method of switching the second-order correction operation coefficient $a_2$ as an example for reducing the test cost. However, not restricted to this, it is also possible to use the function of switching the coefficient for another use. For example, it is also possible to output the A/D conversion result t as a test mode, without performing the correcting operation.

Figure 23:
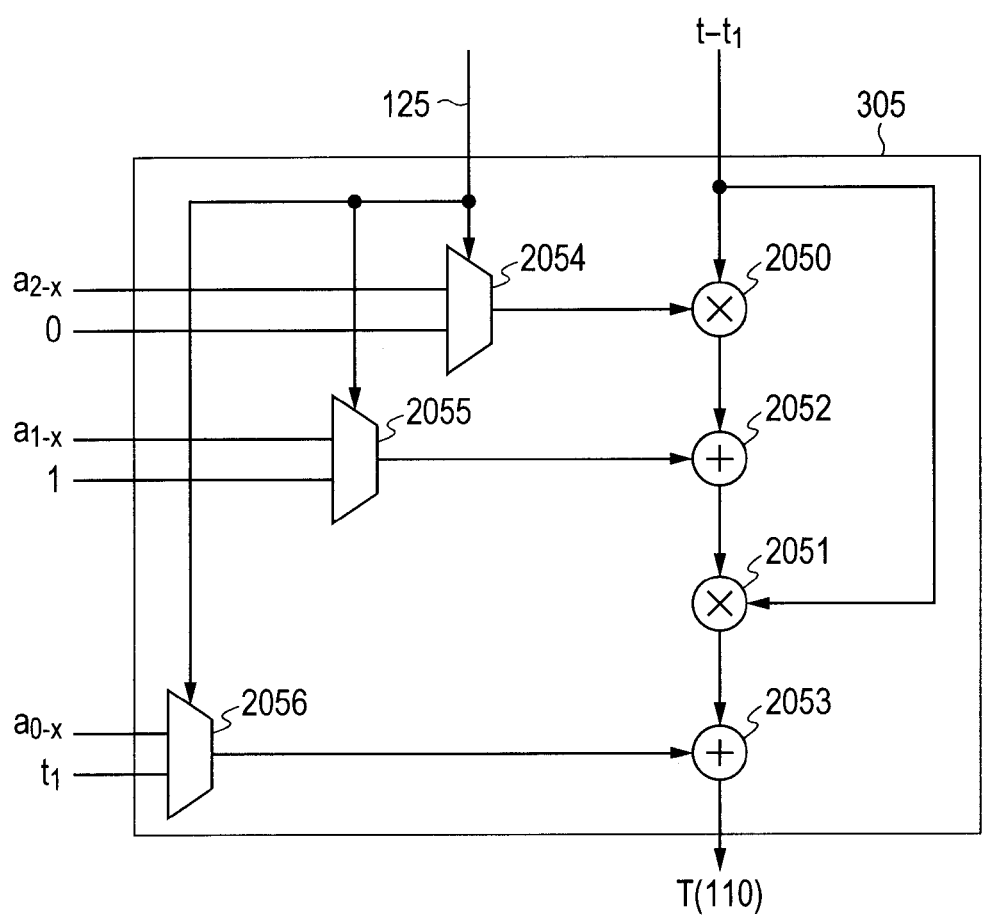
FIG. 23 is an explanatory diagram illustrating a concrete configuration example of a correction operation unit 305 for outputting an A/D conversion result t, without performing the correcting operation.

FIG. 23 illustrates a concrete configuration example of a correction operation unit 305 for outputting the A/D conversion result t, without performing the correcting operation. The correction operation unit 305 further comprises coefficient selectors 2055 and 2056 in addition to the functional part of the correction operation unit 205. The coefficient selector 2054 of the second-order correction operation coefficient $a_2$ selects and outputs either "0" or "$a_{2\_x}$." The coefficient selector 2055 of the first-order correction operation coefficient $a_1$ selects and outputs either "1" or "$a_{1\_x}$." The coefficient selector 2056 of the zero-order correction operation coefficient $a_0$ selects and outputs either "t1" or "$a_{0\_x}$." A selection signal 125 may be inputted, for example from the CPU 30 and others, or may be inputted via the output selector 114 from an external terminal. For example, when the selection signal 125 instructs a normal operation mode, the coefficient selector 2054 outputs "$a_{2\_x}$," the coefficient selector 2055 outputs "$a_{1\_x}$", and the coefficient selector 2056 outputs "$a_{0\_x}$." Accordingly, the correction operation unit 305 outputs an operation result "$T=a_{2\_x}(t-t1)^2+a_{1\_x}(t-t1)+a_{0\_x}$." When the selection signal 125 instructs a test mode, the coefficient selector 2054 outputs "0", the coefficient selector 2055 outputs "1", and the coefficient selector 2056 outputs "t1." Accordingly, the correction operation unit 305 outputs an operation result "T=t." As described above, according to the correction operation unit 305, even by performing the correcting operation, it is possible to fetch the A/D conversion result t, and to perform the operation test of the A/D conversion unit 102, etc.

As described above, the invention accomplished by the present inventors has been concretely explained based on various embodiments. However, it cannot be overemphasized that the present invention is not restricted to the embodiments, and it can be changed variously in the range which does not deviate from the gist.

For example, in Embodiment 1 through Embodiment 3, the method of using the second-order correction operation function has been explained; however it is not restricted to this but it is possible to use a correction operation function of the third or greater order. According to the method, although the test cost increases, the accuracy of the temperature detection can be improved more. The embodiments of the present invention have illustrated the case where the coefficient calculation units 104 and 204 and the correction operation units 105, 205, and 305 are configured with the exclusive logic circuit. However, for example, when it is not likely that a thermal runaway may occur on the grounds that the temperature detection range demanded is narrow etc., they may be realized by the program execution by a CPU, etc.

Embodiment 3 has illustrated the case where the function for switching the correction operation coefficient is applied to the microcomputer 2 according to Embodiment 2. However, it is not restricted to the case, but it is also possible to apply the function for switching to the microcomputer 1 according to Embodiment 1.

What is claimed is:

1. A semiconductor device comprising:
a temperature sensor circuit which detects a temperature of the semiconductor device and outputs temperature data based on the detected device temperature;
a coefficient calculation circuit which calculates a plurality of N-th order coefficients, where N is an integer equal to or greater than one, of a correction function as an N-th order approximation of a characteristic function which relates temperature data output by the temperature sensor circuit and the device temperature, based on N+1 pieces of the temperature data including a theoretical value of the temperature data at absolute zero in the characteristic function and N measured values of the temperature data output by the temperature sensor circuit at N temperature points;
a correction circuit which calculates and outputs a corrected device temperature using the correction function and the calculated N-th order coefficients on the basis of the temperature data outputted from the temperature sensor circuit; and
a central processing unit, coupled to the correction circuit, that controls an engine of a vehicle based on the corrected device temperature output by the correction circuit,
wherein the temperature sensor circuit generates the temperature data on the basis of a first voltage function having a limit at absolute zero which is zero, and a second voltage function having a limit at absolute zero which is non-zero, and
wherein the temperature data indicates a value corresponding to a ratio of the first voltage to the second voltage.

2. The semiconductor device according to claim 1,
wherein the temperature sensor circuit includes a plurality of bipolar transistors having mutually different emitter areas,
wherein the first voltage function corresponds to a difference between base-emitter voltages of two of the bipolar transistors, and the second voltage function corresponds to a forward voltage of a PN junction of the bipolar transistors.

3. The semiconductor device according to claim 1,
wherein the correction operation circuit comprises an exclusive logic circuit.

4. The semiconductor device according to claim 3,
wherein the coefficient calculation circuit comprises an exclusive logic circuit.

5. The semiconductor device according to claim 1,
wherein the correction operation circuit switches the N-th order coefficients depending on a temperature range of the temperature data.

6. The semiconductor device according to claim 5,
wherein the correction operation circuit switches the N-th order coefficients in a higher temperature range and a lower temperature range with reference to a predetermined temperature in the temperature range of required measurement temperature.

7. The semiconductor device according to claim 1,
wherein the temperature sensor circuit comprises:
a temperature-voltage conversion circuit to output first voltages of the first voltage function and second voltages of the second voltage function; and
an analog-to-digital conversion circuit to sample the first voltages and the second voltages via two sampling capacitors, and to generate the temperature data.

8. The semiconductor device according to claim 7,
wherein one end of each of the two sampling capacitors is set to a reference potential of the temperature-voltage conversion circuit, and
wherein the other end of the two sampling capacitors are respectively supplied with one of the first voltages or one of the second voltages when sampling and set to the reference potential of the temperature-voltage conversion circuit when refreshing.

9. The semiconductor device according to claim 7,
wherein the temperature sensor circuit further comprises:
a first signal line through which the first voltages are supplied;
a second signal line through which the second voltages are supplied;
a first shielding wire operable to shield the first signal line; and
a second shielding wire operable to shield the second signal line, and
wherein the first shielding wire and the second shielding wire are set to the reference potential of the temperature-voltage conversion circuit.

10. The semiconductor device according to claim 7,
wherein the temperature sensor circuit further comprises:
a first selection circuit operable to switch from the first voltages and the second voltages to respective external input voltages in response to a selection signal, and to output to the analog-to-digital conversion circuit.

11. The semiconductor device according to claim 10, wherein the temperature sensor circuit further comprises:
a second selection circuit operable to switch an output destination of the temperature data generated by the analog-to-digital conversion circuit, and
wherein the second selection circuit outputs the temperature data to either of an input signal line or an output signal line of the correction operation circuit, in response to the selection signal inputted.

12. A method to correct temperature data of a semiconductor device comprising:
detecting a temperature of the semiconductor device, by a temperature sensor circuit;
generating the temperature data based on the detected temperature of the semiconductor device, by the temperature sensor circuit;
calculating a plurality of N-th order coefficients of a correction function as an N-th order approximation, where N is an integer equal to or greater than one, of a characteristic function which relates the temperature data generated by the temperature sensor circuit and the temperature of the semiconductor device, based on N+1 pieces of the temperature data including a theoretical value of the temperature data at absolute zero in the characteristic function and N measured values of the temperature data output by the temperature sensor circuit at N temperature points; and
calculating a corrected temperature of the semiconductor device using the correction function and the calculated N-th order coefficients on the basis of the measured temperature data outputted from the temperature sensor circuit; and
outputting the corrected temperature to a central processing unit that controls an engine of a vehicle based on the corrected temperature of the semiconductor device,
wherein the temperature sensor circuit generates the temperature data on the basis of a first voltage function having a limit at absolute zero which is zero, and a second voltage function having a limit at absolute zero which is non-zero,
wherein the temperature data indicates a value corresponding to a ratio of the first voltage to the second voltage.

13. The method to correct temperature data according to claim 12,
wherein the first voltage function corresponds to a forward voltage of a PN junction of the temperature sensor circuit, and
wherein the second voltage function corresponds to a difference between respective base-emitter voltages of two bipolar transistors having mutually different emitter areas of the temperature sensor circuit.

* * * * *